United States Patent
Chung et al.

(10) Patent No.: US 10,359,891 B2
(45) Date of Patent: Jul. 23, 2019

(54) MOBILE TERMINAL AND METHOD FOR CONTROLLING THE SAME

(71) Applicant: LG ELECTRONICS INC., Seoul (KR)

(72) Inventors: Sooyon Chung, Seoul (KR); Sujin Kim, Seoul (KR); Sunghye Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 277 days.

(21) Appl. No.: 15/375,432

(22) Filed: Dec. 12, 2016

(65) Prior Publication Data

US 2017/0177115 A1 Jun. 22, 2017

(30) Foreign Application Priority Data

Dec. 18, 2015 (KR) ........................ 10-2015-0181507

(51) Int. Cl.
| | |
|---|---|
| G06F 3/044 | (2006.01) |
| G06F 3/0485 | (2013.01) |
| G06F 3/0488 | (2013.01) |
| G06F 3/0484 | (2013.01) |

(52) U.S. Cl.
CPC ............ *G06F 3/044* (2013.01); *G06F 3/0484* (2013.01); *G06F 3/0485* (2013.01); *G06F 3/0488* (2013.01)

(58) Field of Classification Search
CPC ....... G06F 3/044; G06F 3/0485; G06F 3/0488
See application file for complete search history.

(56) References Cited

U.S. PATENT DOCUMENTS

| 9,423,878 B2* | 8/2016 | Lessing ................... G06F 3/017 |
| 2009/0119614 A1* | 5/2009 | Tienvieri .............. G06F 3/0485 715/786 |
| 2011/0154196 A1 | 6/2011 | Icho et al. |
| 2012/0011272 A1* | 1/2012 | Tanigawa ................ H04L 67/06 709/236 |
| 2013/0342729 A1* | 12/2013 | Kim ....................... H04N 5/772 348/231.3 |
| 2014/0055479 A1 | 2/2014 | Kawanishi et al. |
| 2014/0152599 A1* | 6/2014 | Lee .......................... G06F 3/017 345/173 |
| 2014/0281965 A1* | 9/2014 | Yamaji ................ G06F 3/04817 715/708 |
| 2014/0301653 A1 | 10/2014 | Murphy-Chutorian et al. |

(Continued)

FOREIGN PATENT DOCUMENTS

CN 103414814 11/2013

OTHER PUBLICATIONS

European Office Action dated Jul. 5, 2018 issued in Application 16 002 155.6.

(Continued)

*Primary Examiner* — David E Choi
(74) *Attorney, Agent, or Firm* — KED & Associates LLP

(57) ABSTRACT

A mobile terminal and a method for controlling the same are disclosed. The present invention displays information associated with a first image and a second image on a touchscreen when sliding from the first image to the second image satisfies a predetermined condition while a plurality of images is displayed in a sliding manner by executing a gallery application.

20 Claims, 30 Drawing Sheets

(56) References Cited

U.S. PATENT DOCUMENTS

| | | | |
|---|---|---|---|
| 2014/0304019 A1* | 10/2014 | Scott | G06Q 10/063114 705/7.15 |
| 2015/0169166 A1* | 6/2015 | Kim | G06F 3/0488 715/838 |
| 2015/0189368 A1* | 7/2015 | Lee | H04N 21/4223 725/37 |
| 2017/0177115 A1* | 6/2017 | Chung | G06F 3/044 |

OTHER PUBLICATIONS

European Search Report dated Jan. 13, 2017 issued in Application No. 16002155.6.

* cited by examiner (a)

<next image>

(b)

<next image>

MOBILE TERMINAL AND METHOD FOR CONTROLLING THE SAME

CROSS-REFERENCE TO RELATED APPLICATION

Pursuant to 35 U.S.C § 119(a), this application claims the benefit of earlier filing date and right of priority to Korean Patent Application No. 10-2015-0181507 filed on Dec. 18, 2015, the contents of which are hereby incorporated by reference in its entirety.

BACKGROUND

1. Field

The present invention relates to a mobile terminal and a method of controlling the mobile terminal.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

BRIEF DESCRIPTION OF THE DRAWINGS

The embodiments will be described in detail with reference to the following drawings in which like reference numerals refer to like elements wherein.

The present invention will become more fully understood from the detailed description given herein below and the accompanying drawings, which are given by illustration only, and thus are not limitative of the present invention, and wherein.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
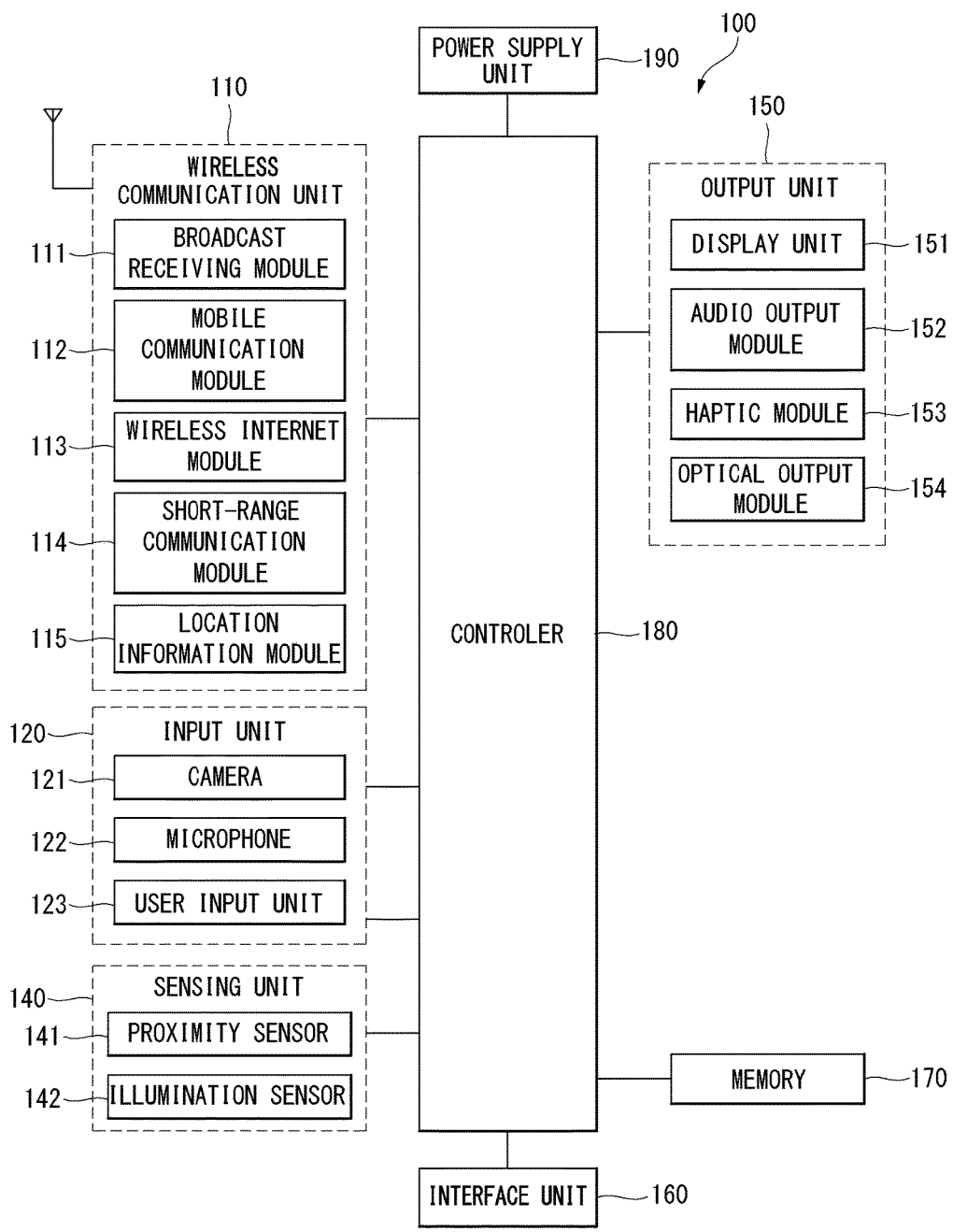
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touchscreen. The touchscreen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touchscreen through software processing, or a touch key which is located on the mobile terminal at a location that is other than the touchscreen. On the other hand, the virtual key or the visual key may be displayed on the touchscreen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touchscreen is implemented as a capacitance type, the proximity sensor 141 can sense proximity of a pointer relative to the touchscreen by changes of an electromagnetic field, which is responsive to an approach of an object with conductivity. In this case, the touchscreen (touch sensor) may also be categorized as a proximity sensor.

The term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is perpendicular to the touchscreen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touchscreen. In addition, the controller 180 can control the mobile terminal 100 to execute different operations or process different data according to whether a touch with respect to a point on the touchscreen is either a proximity touch or a contact touch.

A touch sensor can sense a touch applied to the touchscreen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touchscreen or a touch key provided in addition to the touchscreen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touchscreen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touchscreen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touchscreen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
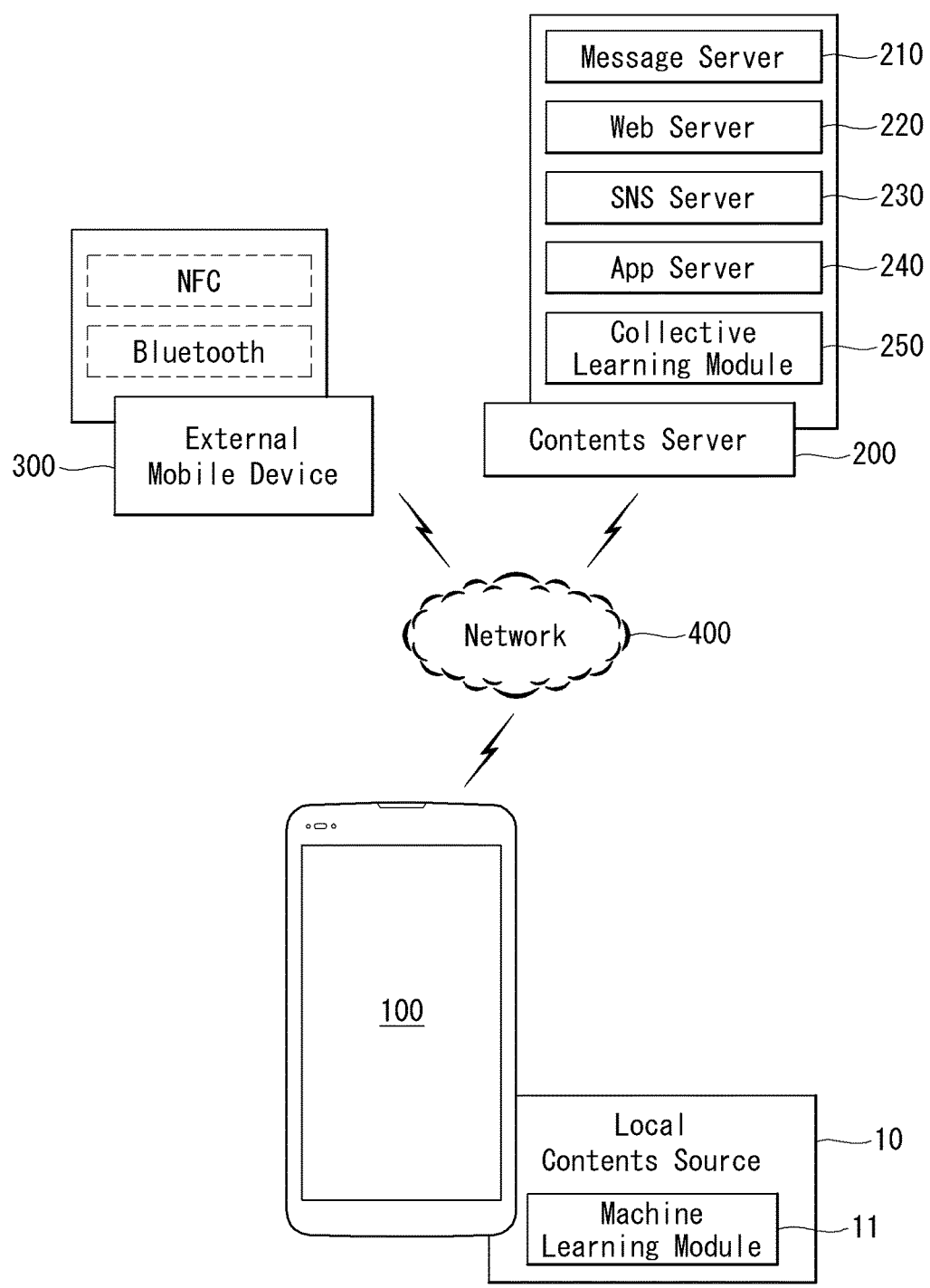
FIG. 2 illustrates a configuration of a system for implementing a method for controlling the mobile terminal according to an embodiment of the present invention.

FIG. 2 illustrates a configuration of a system for implementing a method for controlling the mobile terminal according to an embodiment of the present invention.

The method for controlling the mobile terminal according to an embodiment of the present invention may be implemented in an environment shown in FIG. 2. Referring to FIG. 2, the environment for implementing the method for controlling the mobile terminal according to an embodiment of the present invention may include the mobile terminal 100, a content server 200, an external mobile device 300 and a network 400.

A gallery software application installed and executed in the mobile terminal 100 enables a user to search and view various types of content and to interact with the content. The content may include still images, video, web pages and the like.

Content that can be provided through the gallery application may be locally stored in the mobile terminal 100 or remotely stored (i.e. in a network server). Accordingly, the mobile terminal may be a content source when content is stored in the mobile terminal 100 and an external device may be a content source when content is downloaded from the external device and stored.

The mobile terminal 100 may include a local content source 10. The local content source 10 may include images (still images or video) captured through a camera (121 of FIG. 1) of the mobile terminal 100, images captured through a screenshot function of the mobile terminal 100, etc. That is, the mobile terminal 100 can be the source of content (images) stored in the mobile terminal 100.

The local content source 10 of the mobile terminal 100 may include a local learning module 11 in addition to a source that directly generates content.

The local learning module 11 is a module for implementing a machine learning service and can recognize a mobile terminal utilization pattern of a user by using a machine learning method. The machine learning method collects example data and implicitly defines a rule by extracting features from the collected data, classifying, comparing, recognizing, ranking and clustering the features, instead of defining an explicit rule by a system designer. Such process may be called "machine learning" or simply "learning". Various known methods can be used as the machine leaning method (or algorithm) and description thereof is omitted in the specification.

In the present invention, deep learning may be performed in addition to machine learning. For example, an object included in an image provided through the gallery application can be detected to generate additional information to be provided in a real mode (which will be defined below).

According to an embodiment of the present invention, data (including user input data) collected during execution of the gallery application is processed through machine learning to learn a utilization pattern of a user. In one embodiment, the utilization pattern of the user may be acquired from data obtained during execution of all applications available in the mobile terminal 100 as well as the gallery application.

For example, the controller 180 of the mobile terminal 100 can sense drag input that satisfies a predetermined condition for a specific image during display of predetermined images through the gallery application. In this case, the local learning module 11 determines that the user is interested in the specific image and learns the drag input in a specific pattern and the specific image.

According to one embodiment, learning can be performed through the machine learning module 11 not only in a process of displaying an image generated through the gallery application but also in a process of acquiring an image through a camera. That is, when an image is captured through the camera, image capture time, dates, locations and information about the currently executed application can be acquired as additional information of the image and stored along with image content. In this case, the machine learning module 11 can generate new content including the additional information of the image as well as the image captured using the camera.

Data collected by the machine learning module 11 may include not only data collected in an image acquisition process but also setting information (bell sound volume information, mute setting information, bell sound, brightness level, battery state information, etc.) related to utilization of the mobile terminal 100, calling data (caller, called party, phone number, call state information, etc.)

In one embodiment, data collected through the local content source and the machine learning module 11 is used as context related data. That is, it is possible to provide context related data of an image in addition to display of the image through the gallery application according to one embodiment.

According to an embodiment of the present invention, the image and the context related data thereof may be acquired through the external content server 200.

Referring to FIG. 2, the content server 200 may be connected to the mobile terminal 100 through the network 400 and may include a message server 210, a web server 220, an SNS server 230, an application server 240 and a collective learning module 250.

The content server 200 is not limited to the aforementioned examples and can include any device which enables the mobile terminal 100 to access external servers to download content.

When a message application is executed in the mobile terminal 100, a specific image can be downloaded through the message server 210 using a predetermined chat window as an interface. For example, the mobile terminal 100 can execute a web browser to display a predetermined webpage, download predetermined content from the web server 220 using the webpage as an interface and store the downloaded content. In addition, the mobile terminal 100 can execute an SNS application, download content provided through the execution screen of the SNS application using the SNS server 230 and store the downloaded content. The message server 210, the web server 220 and the SNS server 230 are exemplary components of a content download source.

The content server 200 can include the application server 240. The application server 240 collects data related to a predetermined application when the application is executed in the mobile terminal 100. For example, when the user of the mobile terminal 100 shares a specific image with other people or uploads the specific image to the SNS server while executing the gallery application in the mobile terminal 100 to display the specific image, application data used in the process of sharing the specific image is collected by the application server 240. The collected data can be provided along with the image when the gallery application is executed in the real mode.

The content server 200 may include the collective learning module 250 that executes functions similar to those of the machine learning module 11 corresponding to a component of the mobile terminal 100. That is, the collective learning module 250 can collect interaction information of the user from the mobile terminal 100, perform a learning process and transmit data generated through the learning process to the mobile terminal 100. The operation of the collective learning module may be the same as the aforementioned machine learning module 11. Furthermore, the collective learning module 250 may interoperate with the message server 210, the web server 220 and/or the SNS server 230 of the content server 200.

While the mobile terminal 100 can download content provided by other terminals through the content server 200, the mobile terminal 100 may generate a predetermined short-range communication link with the external mobile device 300 to directly download content locally stored in the external mobile device 300 and store the downloaded content.

The collective learning module 250 may collect data regarding interaction between the mobile terminal 100 and the external mobile device 300 and generate data to be used in the real mode according to an embodiment of the present invention.

According to an embodiment of the present invention, the machine learning module 11 is included in the mobile terminal 100, and thus a learning process according to user interaction is performed through the machine learning module 11 and an operation of sending a request for content based on the learned data to the external content server 200 can be performed. For example, when the mobile terminal 100 is controlled to execute the gallery application in the real mode, content selected on the basis of data learned through the collective learning module 250 can be received from the content server 200 and provided.

The network 400 may be the open Internet, an Intranet, a firewall security network, a wide area cellular network (e.g. 3G network), a wired network, a wireless network (Wi-Fi or Bluetooth) or a combination thereof.

Figure 3:
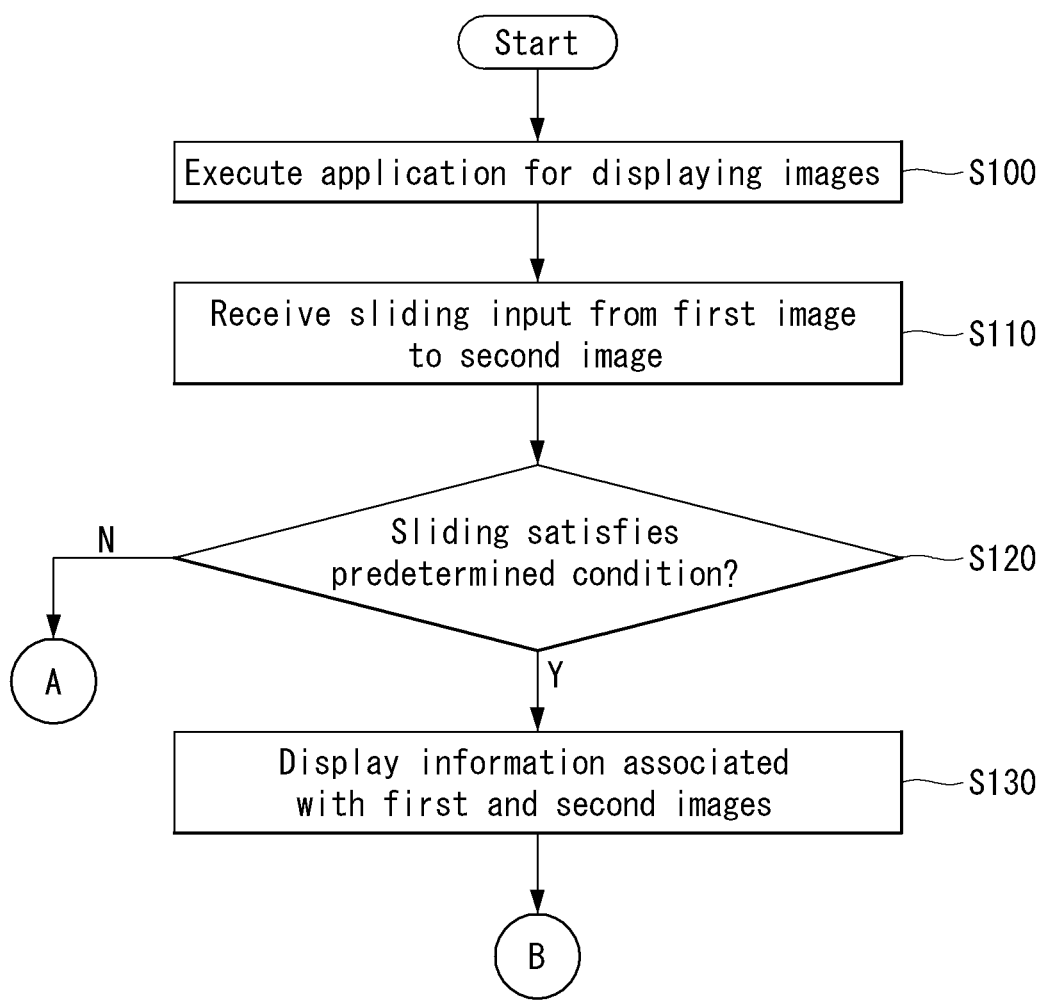
FIG. 3 is a flowchart illustrating a method for controlling the mobile terminal according to an embodiment of the present invention.

FIG. 3 is a flowchart illustrating a method for controlling the mobile terminal according to an embodiment of the present invention.

Referring to FIG. 3, the controller 180 of the mobile terminal 100 may execute an application for displaying an image (S100).

As described above with reference to FIG. 2, the mobile terminal 100 may capture images using the camera and store the images in the memory, or store images downloaded through an external download source in the memory. The stored images may be managed through an image management application (e.g. gallery application). The image management application is not limited to the gallery application and may include any application which can display images. For example, in the case of a camera application, the camera application can interoperate with the gallery application to switch to the gallery application through the execution screen of the camera application so as to display images provided by the gallery application on the display.

The controller 180 may receive input sliding from a first image to a second image (S110).

When the gallery application is executed, the controller 180 can display a plurality of images stored in the memory on the touchscreen 151. The controller 180 can classify the images based on a predetermined criterion and provide the classified images to the touchscreen. The predetermined criterion may be image capture order. That is, when the gallery application is executed, the controller 180 can provide images in image capture (download) order to the touchscreen 151 in such a manner that the controller 180 provides the second image stored at a second time through touch interaction (drag input, flicking input or the like) of the user while the first image stored at first time is displayed on the touchscreen 151.

The predetermined criterion may include information about a position at which an image is captured and a download path in addition to image storage time. The controller 180 may group a plurality of images according to the position information and download path (download source) and display the images as one album. That is, a plurality of album folders grouped based on a predetermined criterion can be provided in an album mode and, when a specific album folder is selected, a plurality of images classified as the selected album can be provided. The plurality of images may be provided to the touchscreen 151 such that the images sequentially slide according to touch interaction of the user.

According to an embodiment of the present invention, when the images are sequentially displayed on the touchscreen 151 based on the predetermined criterion through the gallery application, not only images stored in the memory but also additional information can be provided. That is, the images can be provided along with the additional information through the execution screen of the gallery application during display of images through the gallery application without ending the gallery application or executing an additional application for providing the additional information.

In the specification, the mode of providing additional information in addition to images is defined as a real mode, distinguished from the normal mode in which images are sequentially displayed according to sliding input upon execution of the gallery application. In the real mode, presence of images can be enhanced by displaying the additional information along with the images and stored images can be displayed in various patterns by reflecting interest of the user therein.

The controller 180 may sense a trigger for enabling the gallery application to be executed in the real mode.

The controller 180 may control the gallery application to be executed in the real mode when sliding input from the first image to the second image satisfies a predetermined condition in the normal mode (S120: YES). The controller 180 controls the gallery application to be executed in the normal mode when sliding input from the first image to the second image does not satisfy the predetermined condition (S120: NO).

The predetermined condition may include a case in which the speed of drag input of sliding the first image is lower than a predetermined level. That is, when the speed of user drag input for sliding the second image into view while the first image is displayed is less than the predetermined level, it can be determined that the user has more interest in the first image. The user can view the first image for a long time by dragging the first image.

The predetermined condition will be described in more detail with reference to FIGS. 5 to 8.

The controller 180 may display information related to the first image and the second image on the touchscreen 151 in the real mode when the sliding input according to touch interaction of the user satisfies the predetermined condition (S130).

The information related to the first image and the second image will be described in detail with reference to FIG. 9.

In the specification, the aforementioned operations are implemented under the control of the controller 180. That is, the controller 180 controls predetermined additional information to be displayed along with images on the touchscreen 151 on the basis of an input signal. In the following description, display of images and additional information by the controller 180 means that the controller 180 controls the touchscreen 151 to display the image and additional information.

FIGS. 4 to 8 are views for explaining the embodiment illustrated in FIG. 3.

Figure 4:
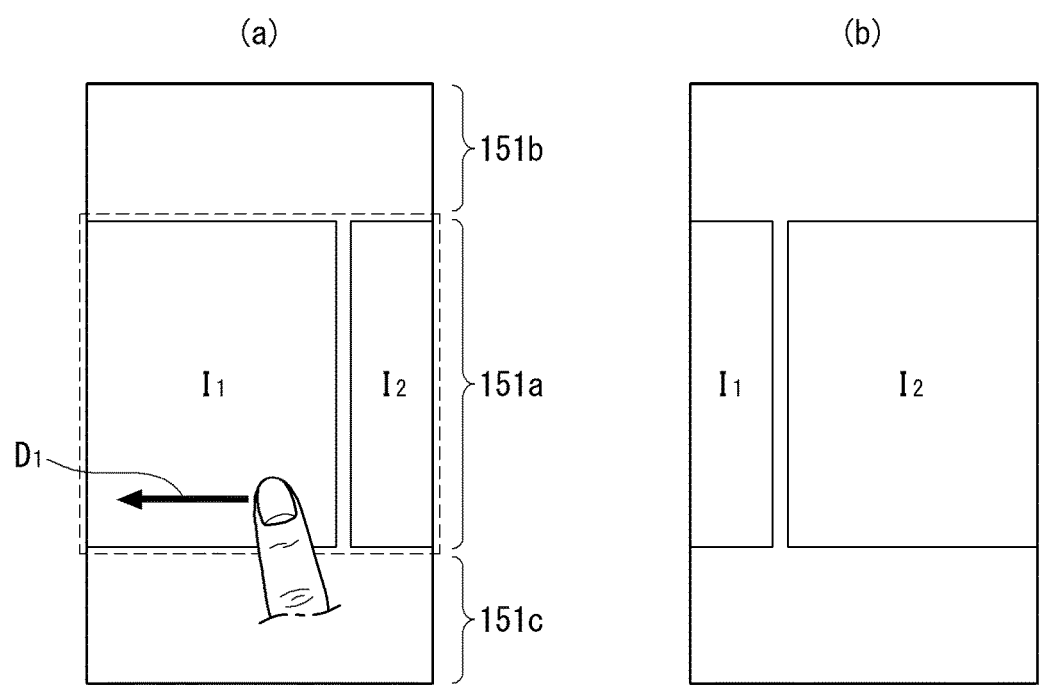
FIGS. 4 to 8 are views for explaining the embodiment illustrated in FIG. 3.

Referring to FIG. 4(a), the controller 180 can display a plurality of images on the touchscreen 151 upon execution of the gallery application. The images can be displayed in a specific area of the touchscreen 151 according to orientation of the mobile terminal 100 or resolution of the images. For example, in a portrait mode of the mobile terminal 100, the images are displayed in a first area 151a of the touchscreen 151 and second and third areas 151b and 151c other than the first area 151a remain blank. In a landscape mode of the mobile terminal 100, image display areas may differ from those shown in FIG. 4.

Referring to FIG. 4(b), upon reception of drag input D1 for sliding the first image I1 to the left while the first image I1 is displayed, the first image I1 slides into view and then the second image I2 slides (following the first image) into view. During sliding, the first image I1 and the second image I2 can slide having little distance therebetween or maintaining a little distance therebetween.

Figure 5:
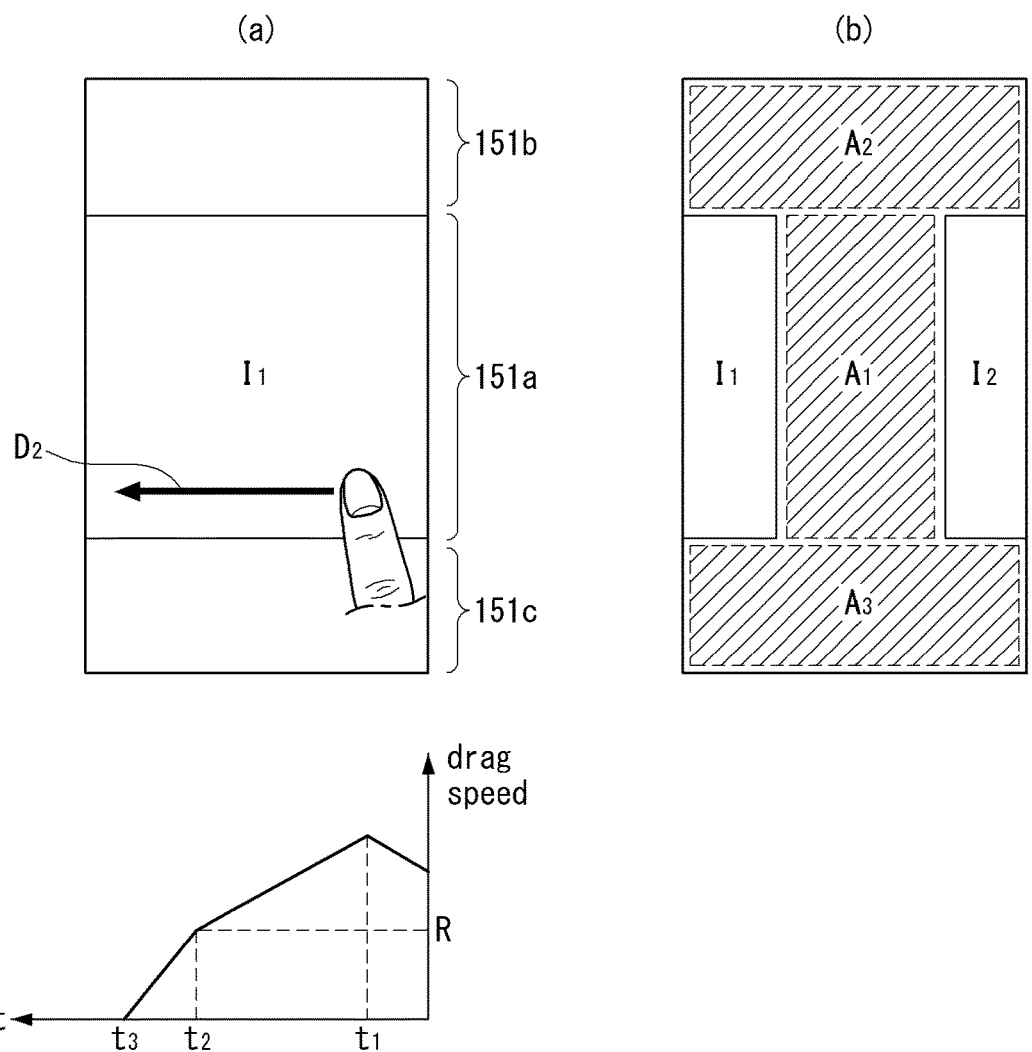

FIG. 5 illustrates an example in which the gallery application is executed in the real mode when a predetermined condition is satisfied during sliding of images according to an embodiment of the present invention.

Referring to FIG. 5(a), the controller 180 senses drag input D2 to the left for the first image I1. The controller 180 can sense increase in the speed of the drag input D2 from the drag input start point to time t1 and then decrease in the speed of the drag input D2 after t1. The drag speed sensed at time t2 decreases below a threshold speed R for entering the real mode and then the drag input may be stopped at a specific point at time t3. The controller 180 can control the gallery application to be executed in the real mode upon sensing of the speed of the drag input D2, which is lower than the threshold speed R.

Referring to FIG. 5(b), the controller 180 may display additional information in at least one of areas (a first area: A1, a second area: A2, a third area: A3) other than the first image I1 and the second image I2 when the gallery application enters the real mode while the first image I1 and the second image I2 slide into view on the touchscreen 151 according to the drag input D2 applied to the first image I1.

The first area A1 may be an area between the first image I1 and the second image I2, the second area A2 may be an area above the first image I1 and/or the second image I2, and the third area A3 may be an area below the first image I1 and/or the second image I2.

While the area in which the additional information is displayed is divided into the first area A1, the second area A2 and the third area A3 in the aforementioned example, the present invention is not limited thereto. For example, a plurality of images may be displayed in the overall area of the touchscreen 151 through the gallery application. Accordingly, the area in which the first and second images I1 and I2 slide into view may not be limited to the middle part of the touchscreen 151, as shown in FIG. 5(b), and the first and second images I1 and I2 may be displayed in different regions on the touchscreen 151 since the first and second images I1 and I2 have different sizes and resolutions. In this case, the additional information may be displayed in an area of the touchscreen 151 other than the first image I1 and/or the second image I2.

Figure 6:
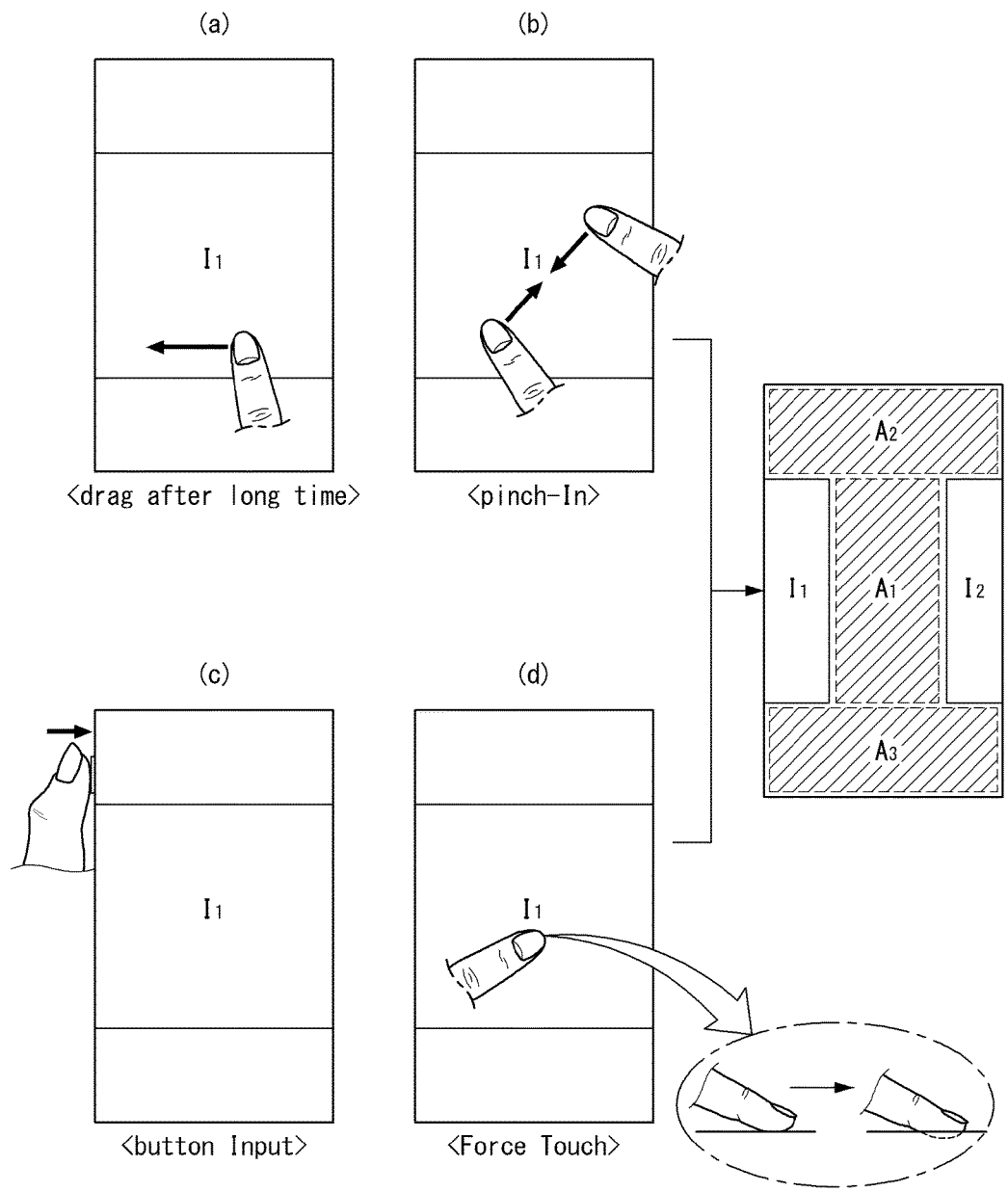

A description will be given of another example of the predetermined condition for entering the real mode with reference to FIGS. 6, 7 and 8.

Referring to FIG. 6(a), the controller 180 can sense reception of drag input applied to the first image I1 a long time after the first image I1 is displayed on the touchscreen 151. The long time refers to a predetermined time set by the user and is used to determine that the user is interested in the first image I1 such that additional information about the first image I1 is provided in the real mode. It is possible to sense whether the user gazes at the first image I1 for a predetermined time or longer by tracking the gaze of the user through the camera (121 of FIG. 1) of the mobile terminal 100 as necessary.

Referring to FIG. 6(b), the controller 180 can control the gallery application to enter the real mode upon sensing of pinch-in input applied to the first image I1.

Referring to FIG. 6(c), the controller 180 can control the gallery application to enter the real mode upon sensing of input applied to the user input unit 123 provided to a region of the body of the mobile terminal 100 with the first image I1 displayed on the touchscreen 151.

Referring to FIG. 6(d), the controller 180 can control the gallery application to enter the real mode according to force applied to a specific point of the touchscreen 151. For example, the controller 180 can sense touch applied to a first point of the first image I1 displayed on the touchscreen 151 with a first force. The touchscreen 151 includes a capacitive touch panel such that the touchscreen 151 can sense touch applied to the first point by detecting variation in capacitance of an electrode corresponding to the first point according to touch input of the user. The controller 180 can sense variation in capacitance and/or the form of dielectric by a second force greater than the first force and applied to the first image I1 while touch applied to the first point is maintained. The first force may change to the second force continuously instead of discretely, and the controller 180 can control the gallery application to be executed in the real mode upon sensing variation in touch force applied to the first point. After the mobile terminal 100 switches to the real mode according to application of the second force, the real mode switches to the normal mode when touch input is released.

Figure 7:
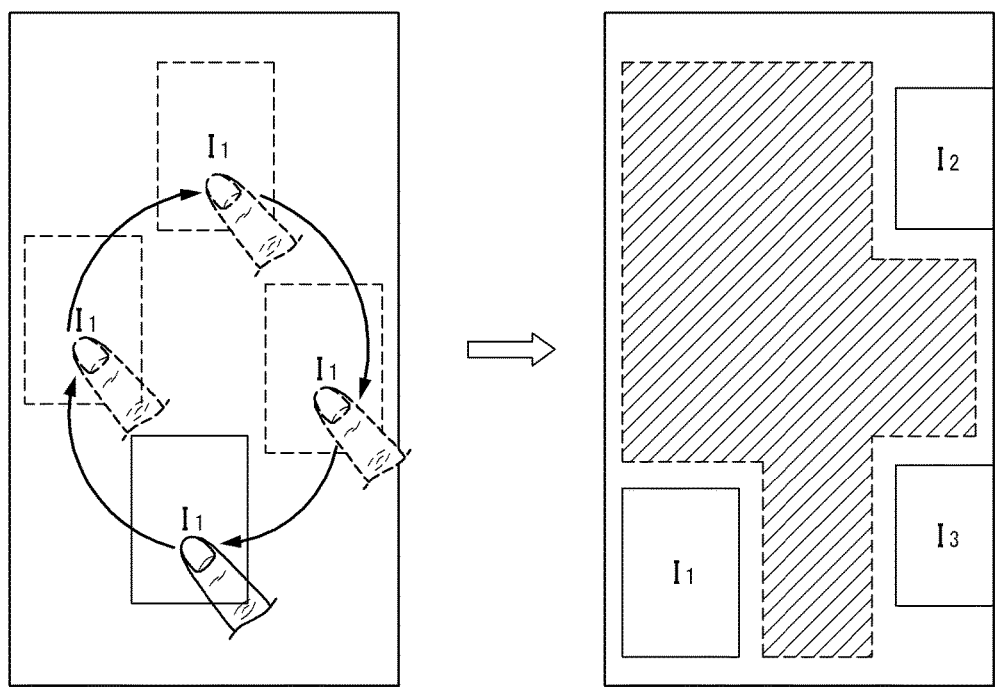

Referring to FIG. 7, the position of the first image I1 displayed on the touchscreen 151 may be changed according movement of touch input of the user on the touchscreen 151. When the user touches the first image I1 and then moves the touch in various directions on the touchscreen 151, the controller 180 can determine that the user wants additional information about the first image I1. Accordingly, the controller 180 can control the gallery application to be executed in the real mode upon sensing change of the position of the first image I1 on the touchscreen 151 according to movement of touch applied to the first image I1.

The controller 180 can display information related to at least one of second and third images I2 and I3 other than the first image I1 on the touchscreen 151 in the real mode.

Figure 8:
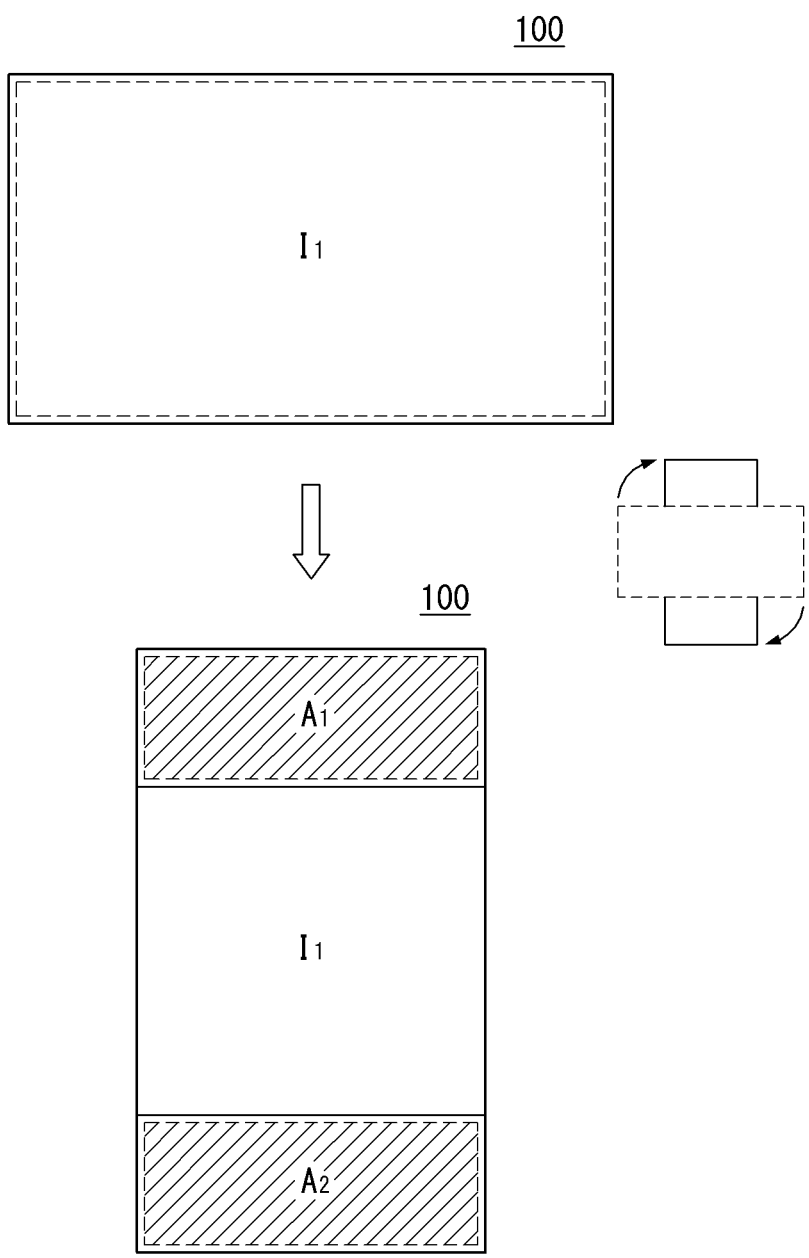

Referring to FIG. 8, the controller 180 can control the gallery application to be executed in the real mode upon sensing change of the orientation of the mobile terminal 100 while the first image I1 is displayed. For example, the controller 180 can sense switching from the landscape mode in which the first image I1 is displayed in the overall area of the touchscreen 151 to the portrait mode of the mobile terminal 100. When the first image I1 is displayed in the portrait mode, the resolution thereof is changed and blank areas may be generated above and below the first image I1. In the real mode, additional information can be displayed in the blank areas.

A detailed description will be given of a process of displaying additional information related to images when the gallery application is executed in the real mode.

Figure 9:
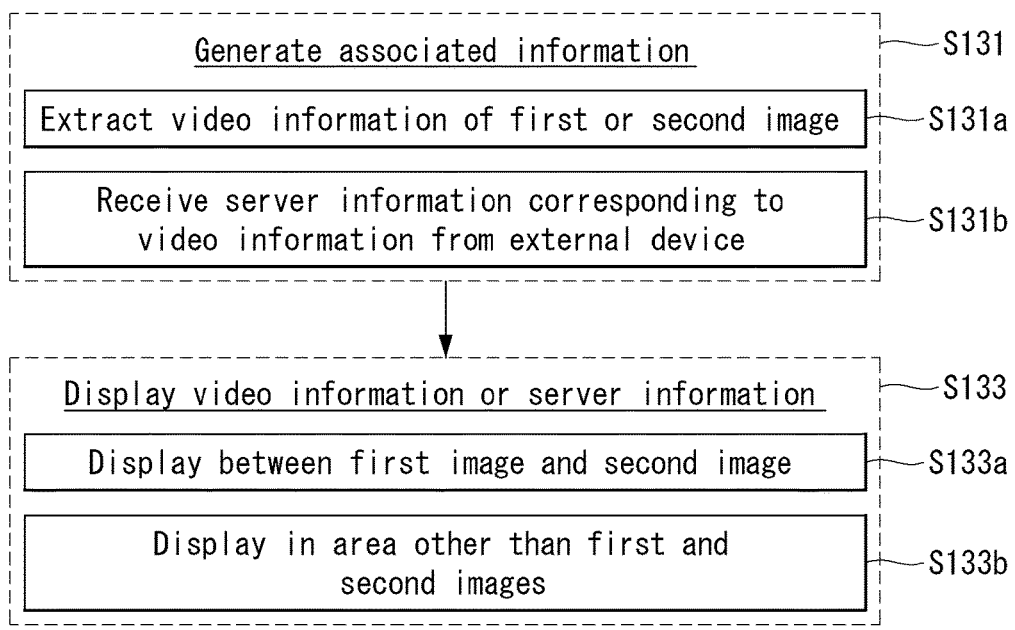
FIG. 9 is a flowchart illustrating the method for controlling the mobile terminal for explaining the embodiment illustrated in FIG. 3 in more detail.
Figure 10:
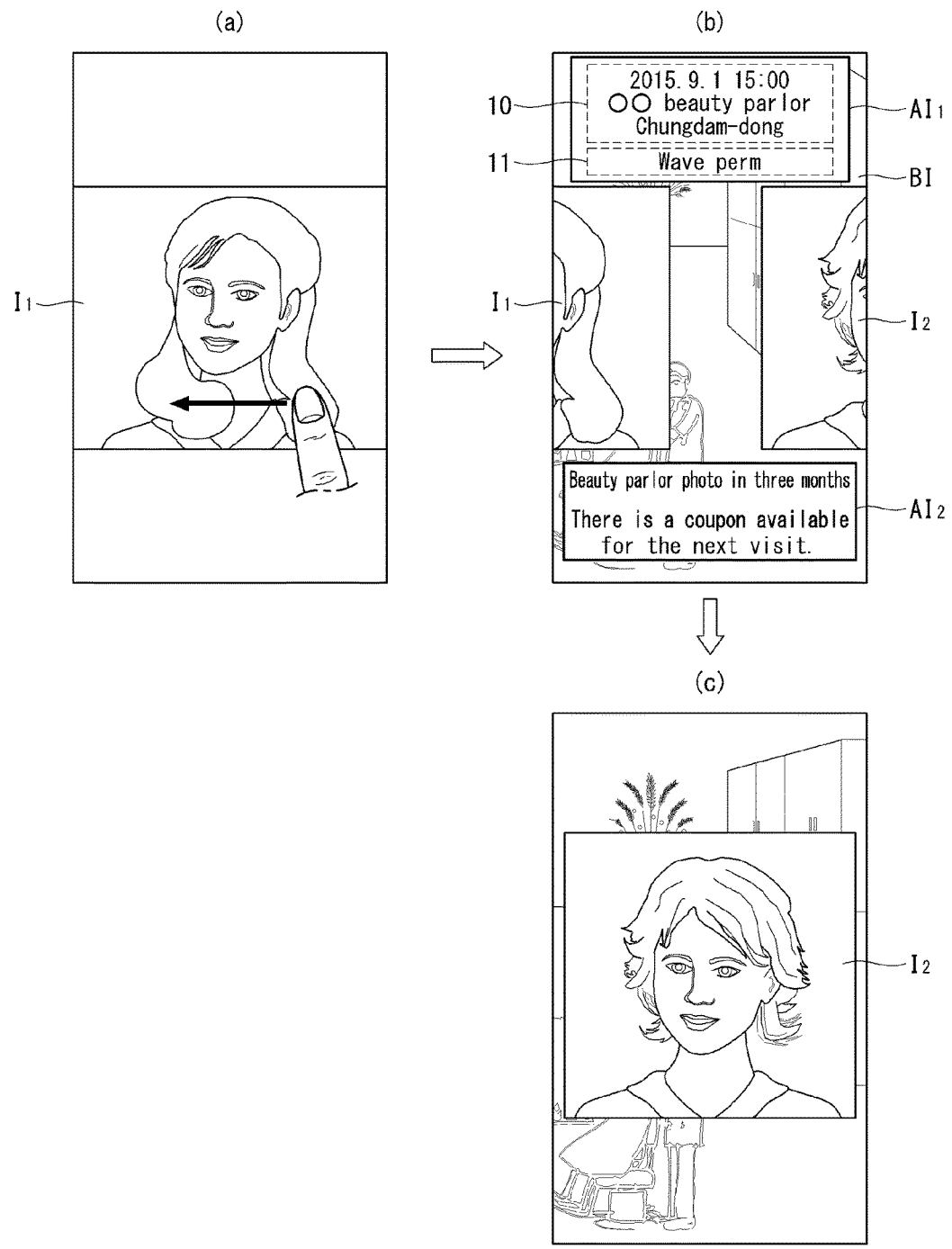
FIGS. 10 to 13 are views for explaining the embodiment illustrated in FIG. 9.

FIG. 9 is a flowchart illustrating a method for controlling the mobile terminal for describing the embodiment shown in FIG. 3 in more detail.

Referring to FIG. 9, the controller 180 generates information related to an image displayed on the touchscreen 151 when the gallery application is executed in the real mode (S131).

The related information may be based on data learned through the machine learning module 11, as shown in FIG. 2. Alternatively, the related information may be based on data learned through the collective learning module 250 at the request of the mobile terminal 100.

The controller 180 may extract video information of first and second images (S131a). The controller 180 may receive server information corresponding to the video information and store the same in the memory (S131b).

The controller 180 may extract the video information from information stored in the mobile terminal 100.

The first image and/or the second image may be images captured through the camera 121 of the mobile terminal 100 and stored in the memory 170 or images downloaded from an external server and stored in the memory 170. The first image and/or the second image may include images received from an external device through a short-range communication link between the mobile terminal 100 and the external device.

The video information may be automatically stored along with the images upon capturing of the images. For example, the video information can include titles of the images (which can be set by the user), type (JPEG), dates, positions at which the images will be stored (e.g. a specific album of the gallery application), size information, resolution and image characteristics (iris, exposure time and ISO information).

In addition, the video information may be information additionally collected according to setting of the user. For example, when information about a position at which an image is captured, information about a person corresponding to a face included in the captured image, and the position or time at which the image is captured correspond to schedule information registered to a calendar application, the schedule information may be stored as additional video information.

In addition, the video information may be URL information of an external server. That is, when an image stored in the memory is a downloaded image, download source information may be added and stored as the video information.

Furthermore, the video information may be information generated according to user interest upon determining the user interest from a plurality of images sliding into view in real time, in addition to information acquired during capture or download of images.

The video information is not limited to the aforementioned examples and can include image-related information that can be collected automatically or manually when images are stored or downloaded.

The video information may be stored in an external server and transmitted to the mobile terminal 100 at the request of the user.

While the example in which additional information related to an image is displayed along with the image in the real mode has been described, the present invention is not limited thereto. For example, images in which user interest is reflected can be provided following the first image in the real mode. Furthermore, images can be used in various manners using additional information provided in the real mode.

The controller 180 may display the acquired video information (including external server information) on the touchscreen 151 (S133).

The controller 180 may display the acquired additional information (related to the images) between the first image and the second image (S133a) or display the same in an area other than areas in which the first and second images are displayed (S133b).

FIGS. 10 to 13 are views for explaining the embodiment illustrated in FIG. 9.

Referring to FIG. 10(a), the controller 180 can receive sliding input for changing the first image I1 to the second image I2 upon display of the first image I1 on the touchscreen 151 by executing the gallery application. When the sliding input satisfies the aforementioned predetermined condition, the controller 180 controls the gallery application to be executed in the real mode.

Referring to FIG. 10(b), the controller 180 displays information related to the first image I1 and/or the second image I2 on the touchscreen 151 upon entering the real mode while moving the first image I1 to the left and sliding the second image I1 according to the sliding input.

The controller 180 can display first associated information AI1 in an area above the images and display second associated information AI2 in an area below the images.

The first associated information AI1 may be local information automatically stored in the mobile terminal 100 when the images are stored. For example, when the first image I1 and the second image I2 have been captured at the same date in the same place, the controller 180 can display information 10 about the date and place as the first associated information AI1. The first associated information AI1 may be an image title 11 input by the user when the captured images are stored.

The second associated information AI2 may include service information related to the place where the first and second images I1 and I2. In this case, the second associated information AI2 may be server information which is not present when the captured images are stored and is received from an external server when the galley application is executed in the real mode. Such server information may disappear when the real mode is ended.

The controller 180 may temporarily stop image sliding such that the user can use information provided in the real mode when the gallery application enters the real mode.

Referring to FIG. 10(c), the controller 180 can display the second image I2 on the touchscreen 151 upon reception of input of dragging the second image I2 in the real mode. The second image I2 may be displayed in the real mode or after the real mode is ended.

The controller 180 can set an image that can represent the first and second images I1 and I2 in the real mode as a background image and display the background image on the touchscreen 151. That is, the background image BI can be displayed in the background of the first image I1 and the second image I2 such that the first image I1 and/or the second image I2 overlap at least part of the background image BI in the real mode. When the first and second images I1 and I2 have been captured in the same place, the background image BI can be set to an image that can represent the place in consideration of the illuminance, color and optical angle in the space. Accordingly, the user can intuitively recognize the place where the first image I1 and/or the second image I2 have been captured.

Figure 11:
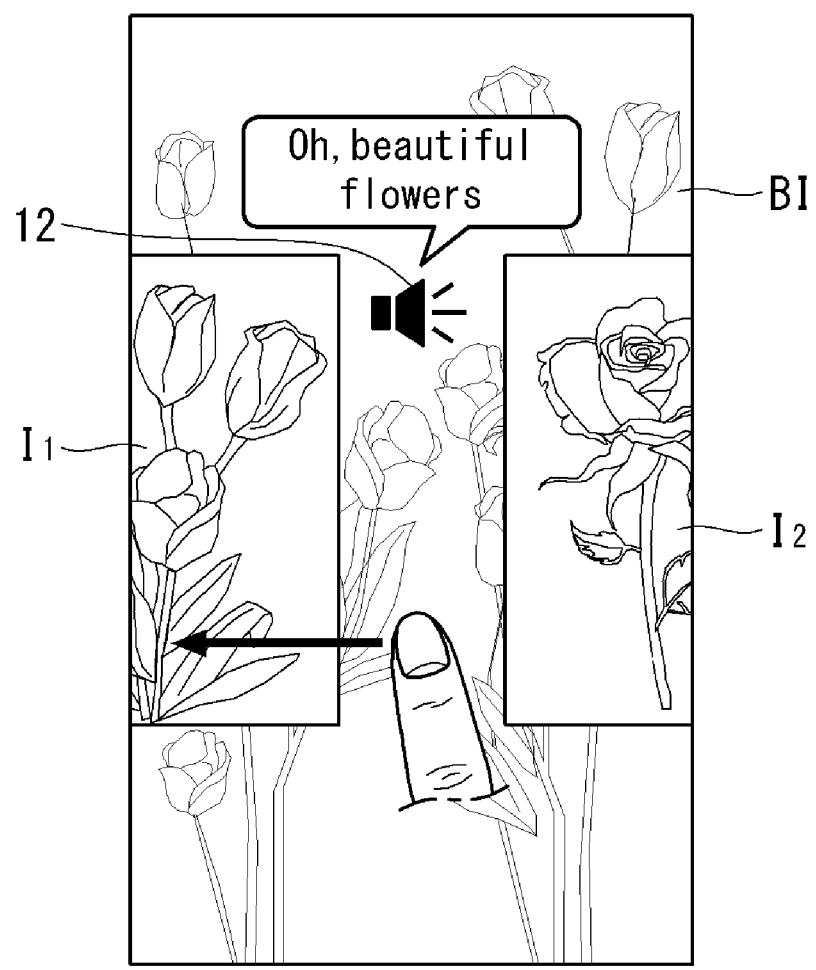

Referring to FIG. 11, a conversation of the user can be recorded and stored with the first and second images I1 and I2 during capture of the first and second images I1 and I2. The controller 180 can display a voice icon 12 between the first image I1 and the second image I2 when user voice, recorded during capture of the first and second images I1 and I2, is present in the real mode. The recorded voice can be output through the output unit upon selection of the voice icon 12.

Figure 12:
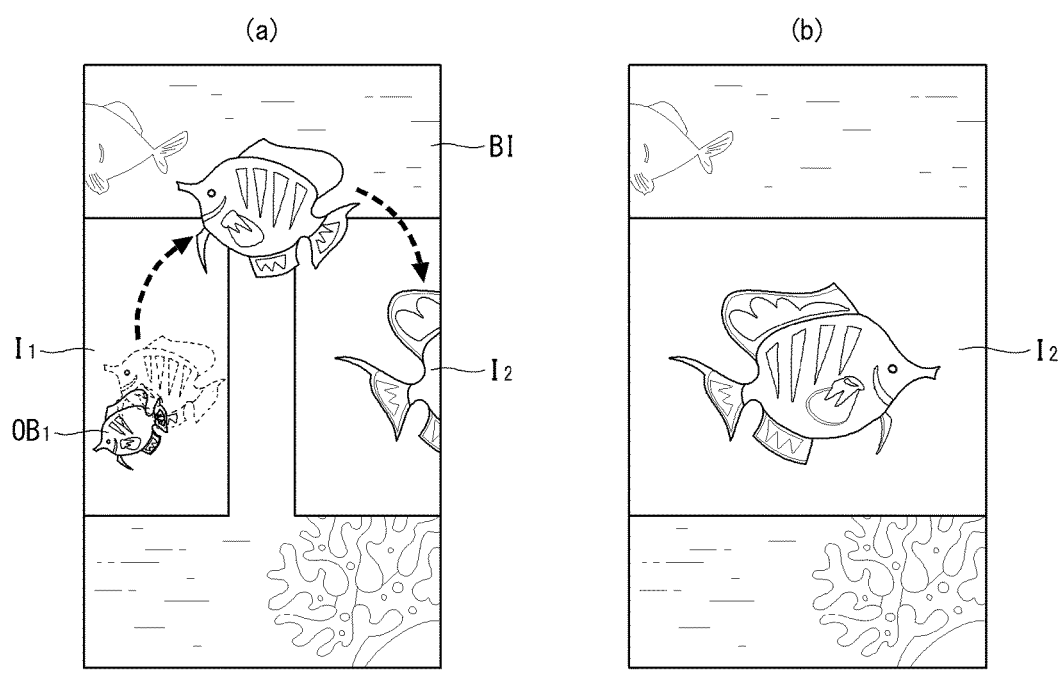

Referring to FIG. 12, when images captured at the same view slide into view in the real mode and an object is commonly included in the images, the controller 180 can extract a position value of the common object. The controller 180 can apply animation effects to the common object having position value variation.

For example, the controller can detect presence of a first object OB1 in the first image I1 and the second image and inconsistency between the position of the first object OB1 in the first image I1 and the position of the first object OB1 in the second image I2. The controller 180 can apply dynamic animation effects representing that the first object OB1 flies from the first image I1 to the second image I2 in the real mode. Accordingly, the user can intuitively recognize that images capturing the same object continuously slide into view.

Figure 13:
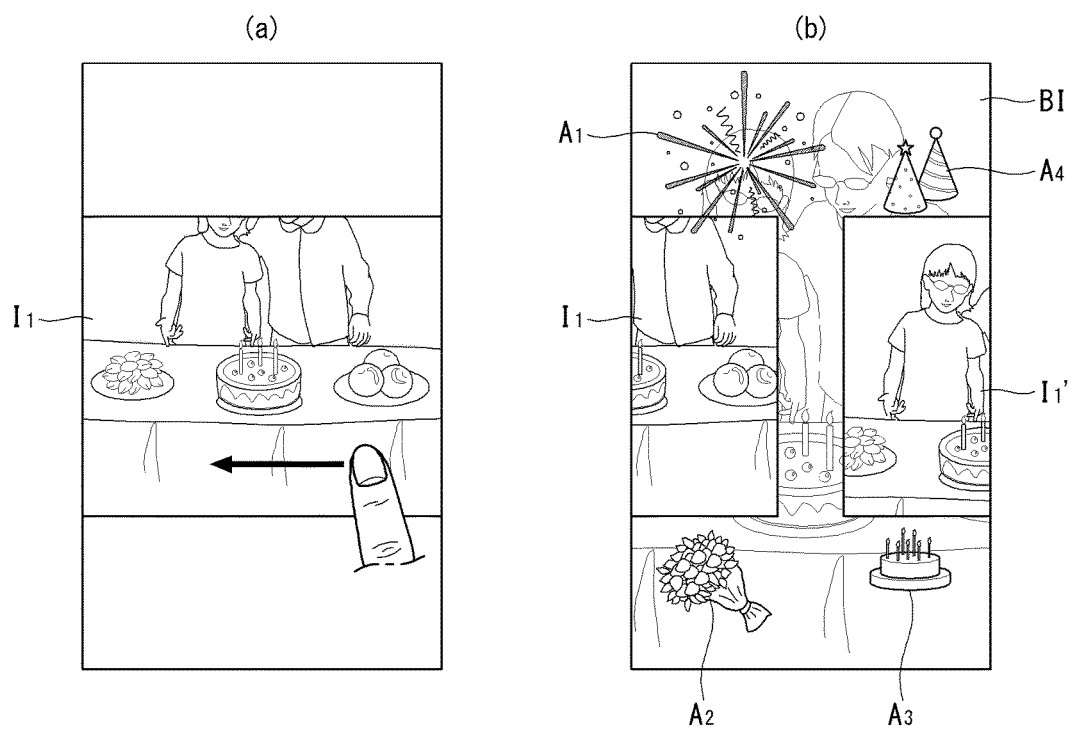

Referring to FIG. 13, the first image I1 may be an image including a person or an image including only the lower body of a person. The controller 180 can search images continuously captured at the same time as the first image I1 for an image including the upper body of the person and provide the image as a second image I1' in the real mode.

The controller 180 can analyze images captured at the same time as the first image I1 and provide animation effects A1, A2 and A3 in the real mode. In addition, the controller 180 can set a representative image from among the images captured at the same time as the first image I1 as a background image BI of the first image I1 and display the background image BI.

Figure 14:
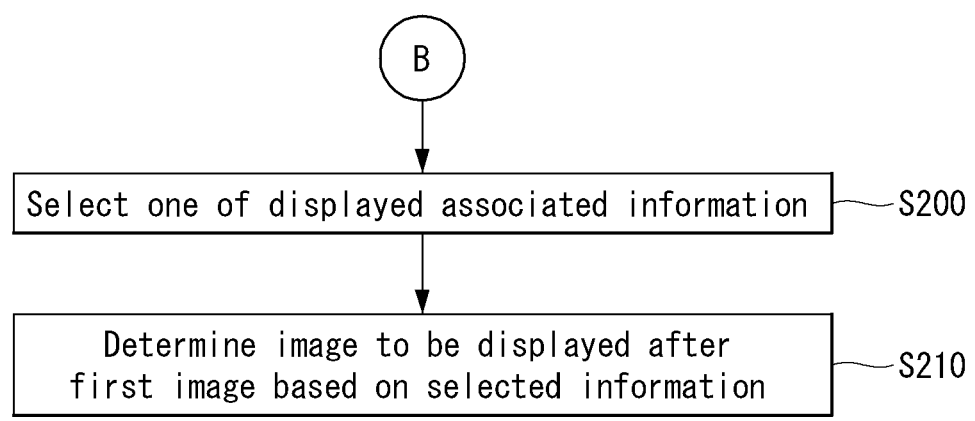
FIG. 14 is a flowchart illustrating a method for controlling the mobile terminal according to another embodiment of the present invention.
Figure 15:
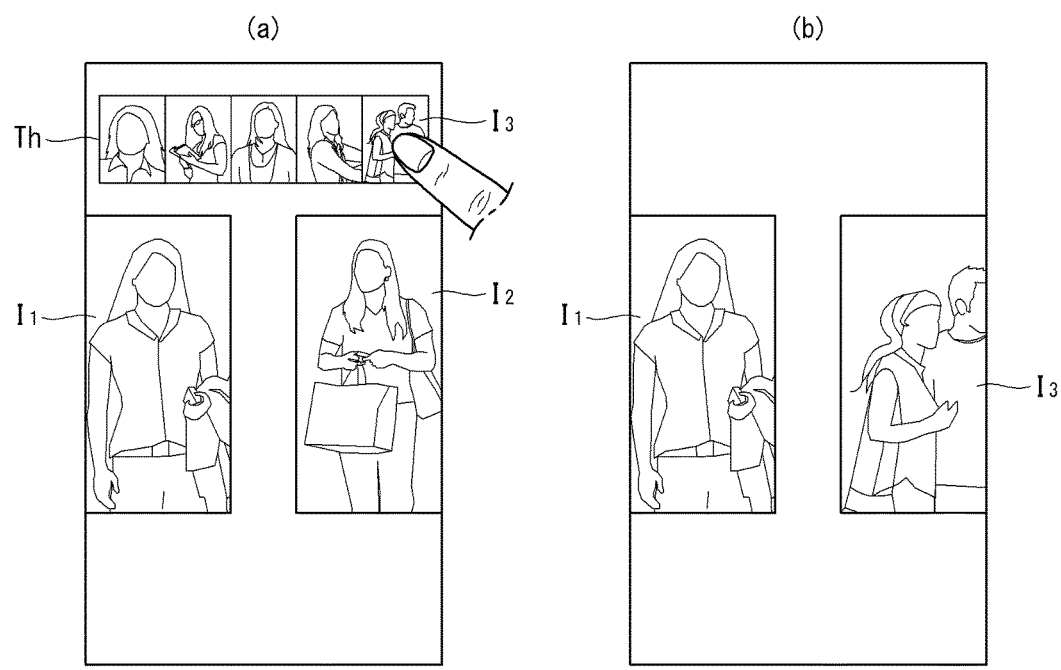
FIGS. 15 and 16 are views for explaining the embodiment illustrated in FIG. 14.
Figure 16:
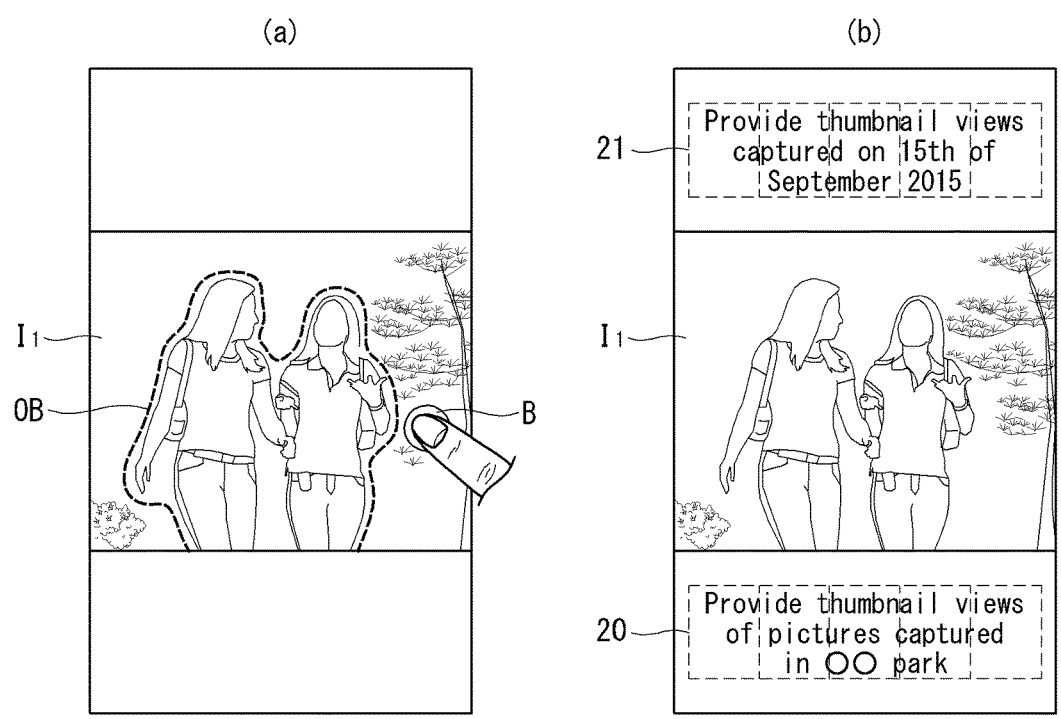

FIG. 14 is a flowchart illustrating a method for controlling the mobile terminal according to another embodiment of the present invention. FIGS. 15 and 16 are views for explaining the embodiment illustrated in FIG. 14. The embodiment illustrated in FIG. 14 may be implemented on the basis of the embodiment illustrated in FIG. 3.

Upon display of information associated with first and second images in the real mode, the controller 180 may use information associated with first and second images for images to be displayed.

Referring to FIG. 14, the controller 180 receives input for selecting associated information (S200). The controller 180 may determine an image to be displayed after the first image I1 on the basis of the selected information (S210).

Distinguished from sequential display of a plurality of images through sliding input in the normal mode, an image to be displayed can be set using information provided in the real mode.

Referring to FIG. 15, when the second image I2, which will slide into view after the first image I1, includes the same person as included in the first image I1 (for example, first to fourth images which will slide into view include the same person), the controller 180 can enter the real mode and then provide thumbnail images of a plurality of images including the person from among images stored in the memory 170 to the touchscreen 151.

Upon reception of input for selecting a specific thumbnail image I3 from among the thumbnail images Th, (FIG. 15(a)), the controller 180 can display an image I3 corresponding to the selected thumbnail image I3 on the touchscreen 151 (FIG. 15(b)). Accordingly, the user can be immediately provided with desired images using additional information provided in the real mode without screen change for displaying a specific image since previously captured images including the person are provided.

Referring to FIG. 16, upon reception of input (e.g. long touch input applied to the background) for selecting a background other than person objects OB included in the first image I1, the controller 180 can enter the real mode and then provide other images captured at the position where the first image I1 has been captured as additional information. The controller 180 can extract position information and capture time information from video information of the first image I1. The controller 180 can provide thumbnail images 20 of images captured at the corresponding position at the corresponding time to the touchscreen 151. Furthermore, the controller 180 can provide thumbnail images 21 of images captured at the same date as the capture time to the touchscreen 151.

Examples of using additional information provided in the real mode during execution of the gallery application have been described. The present invention is not limited to the aforementioned examples and may additionally execute functions other than the function of the gallery application in the mobile terminal 100 to use the additional information.

Figure 17:
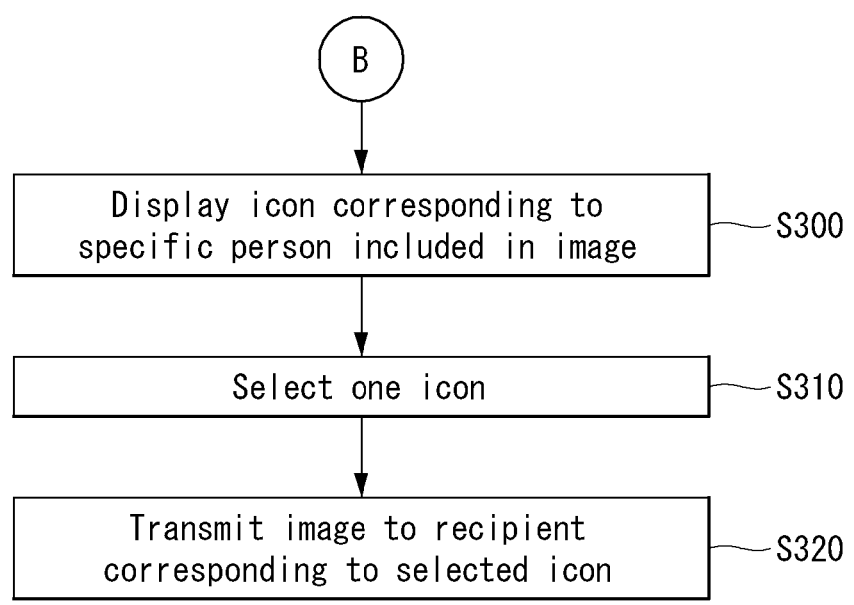
FIG. 17 is a flowchart illustrating a method for controlling the mobile terminal according to another embodiment of the present invention.
Figure 18:
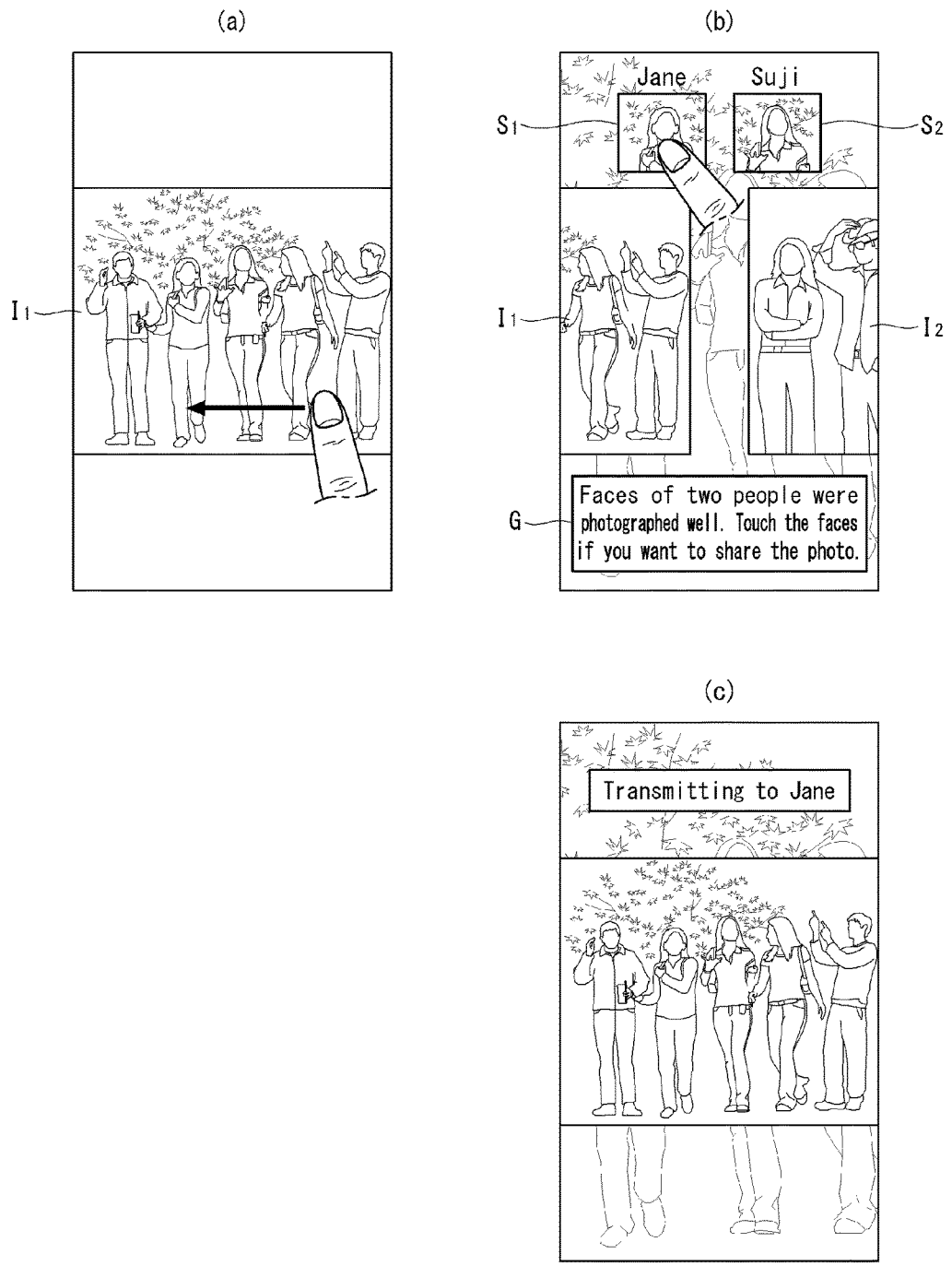
FIG. 18 is a view for explaining the embodiment illustrated in FIG. 17.

FIG. 17 is a flowchart illustrating a method for controlling the mobile terminal according to another embodiment of the present invention. FIG. 18 is a view for explaining the embodiment illustrated in FIG. 17. The embodiment illustrated in FIG. 17 may be implemented on the basis of the embodiment illustrated in FIG. 14 or by being combined with the embodiment illustrated in FIG. 14.

Referring to FIG. 17, the controller 180 displays information associated with the first and second images by controlling the gallery application to be executed in the real mode. The associated information may be information about specific persons included in the first image I1 and/or the second image I2. Accordingly, the controller 180 can provide icons S1 and S2 corresponding to the specific persons included in the images to the touchscreen 151 as the associated information (S300).

The controller 180 may receive input for selecting one of the icons S1 and S2 corresponding to the specific persons (S310).

The controller 180 can set the person corresponding to the selected icon to a recipient and transmit the images to the recipient (S320).

That is, when the galley application is executed in the real mode, it is possible to share images more easily using additional information provided in the real mode while execution of the gallery application is maintained without additionally executing an image sharing function and selecting a recipient.

Referring to FIG. 18, the controller 180 receives drag input sliding to the left on the first image I1 displayed on the touchscreen 151 and, when the drag input satisfies a predetermined condition, controls the gallery application to be executed in the real mode.

The first image I1 may be an image including people and the controller 180 can select a specific person from the first image I1. The controller 180 can select a person whose face stands out, a person gazing at the camera or a person whose face shape has been clearly captured from the image and display thumbnail images S1 and S2 of corresponding persons on the touchscreen 151. A criterion for selecting the persons may be set in various manners.

Upon reception of input for selecting a specific thumbnail image S1 in a state that a representative image of the corresponding person is registered as contact information of the mobile terminal 100, the controller 180 can transmit the image I1 to the selected person "Jane". The controller 180 may provide guide information G for using the thumbnail images S1 and S2 in the real mode to the touchscreen 151 along with the image and the thumbnail images.

Figure 19:
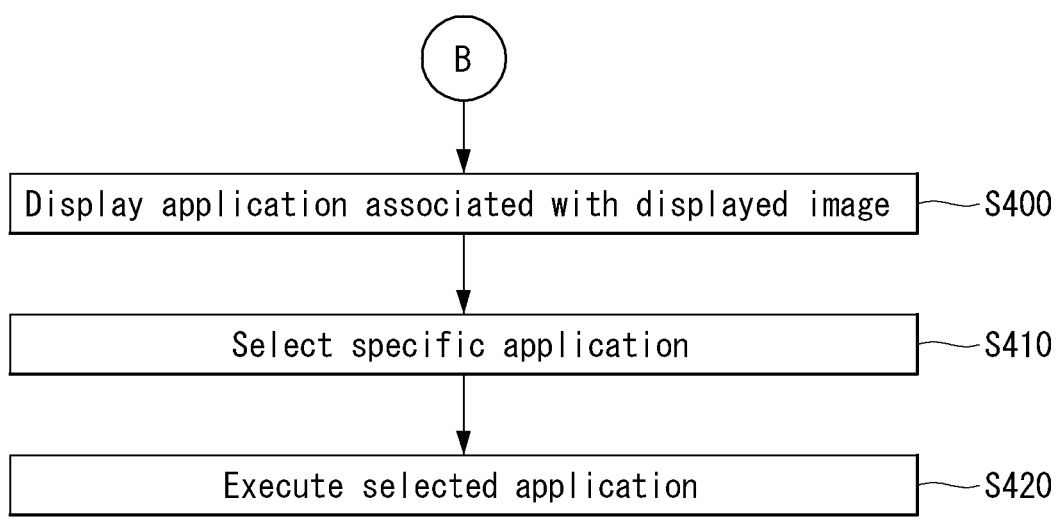
FIG. 19 is a flowchart illustrating a method for controlling the mobile terminal according to another embodiment of the present invention.
Figure 20:
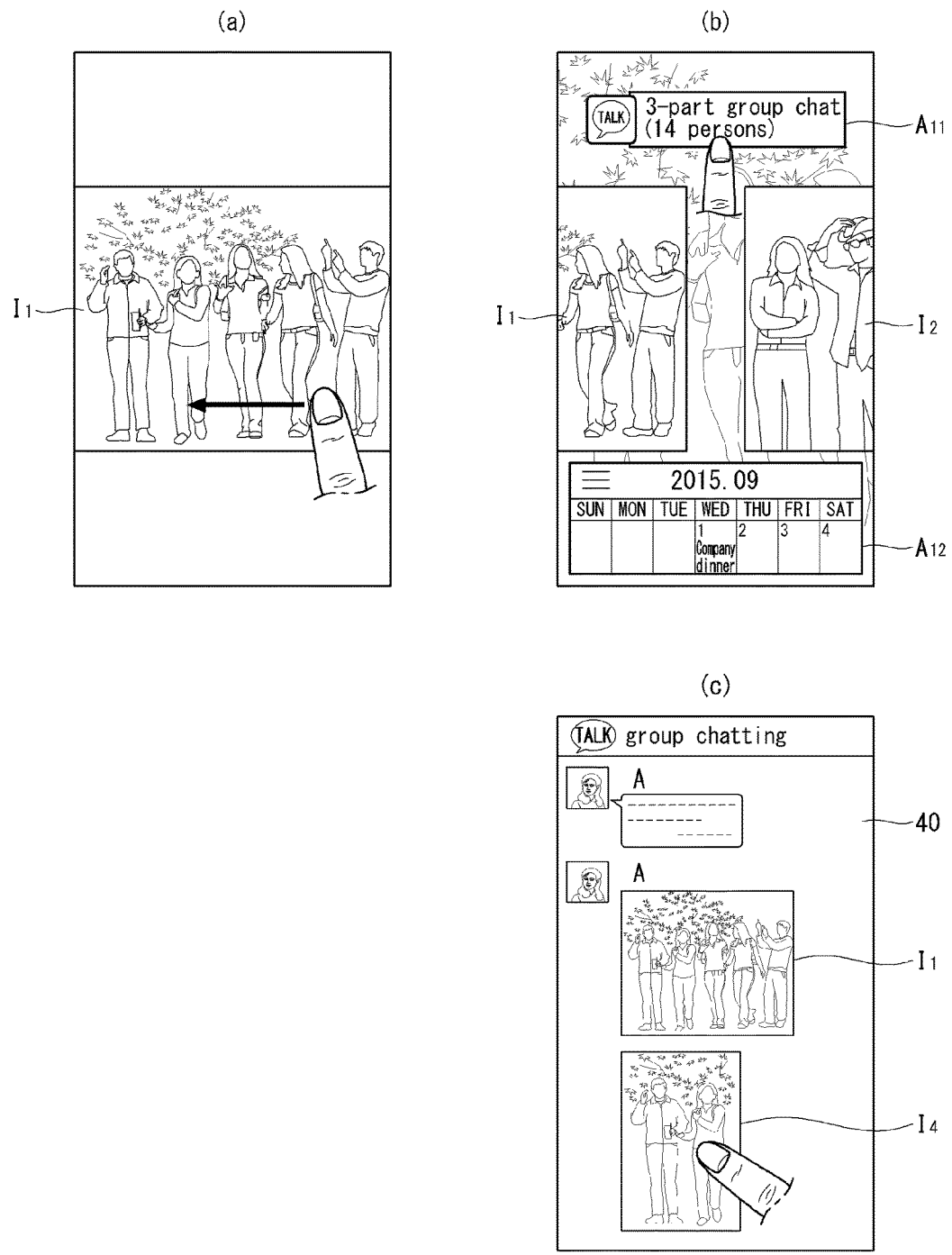
FIG. 20 is a view for explaining the embodiment illustrated in FIG. 19.

FIG. 19 is a flowchart illustrating a method for controlling the mobile terminal according to another embodiment of the present invention. FIG. 20 is a view for explaining the embodiment illustrated in FIG. 19. The embodiment illustrated in FIG. 19 may be implemented on the basis of the embodiments illustrated in FIGS. 3, 14 and/or 17 or by being combined therewith.

Referring to FIG. 19, the controller 180 displays information associated with the first and second images in the real mode. The associated information may include applications associated with the displayed images (S400).

When a specific application is selected from among applications displayed in the real mode (S410), the controller 180 executes the selected application (S420).

Referring to FIG. 20, the controller 180 controls the gallery application to be executed in the real mode when sliding input applied to the first image I1 displayed on the touchscreen 151 satisfies the predetermined condition.

As described above, images displayed by executing the gallery application may include not only images captured through the camera of the mobile terminal 100 but also downloaded images.

Referring to FIG. 20, the controller 180 can display a download source application A11 of the first image I1 and/or the second image I2 on the touchscreen 151. The download source application A11 may include a messenger application and an SNS (Social Network Service) application. When the date when the first image I1 and/or the second image I2 were captured has been registered in a schedule application, the controller 180 can provide the schedule application A12 as the associated information.

When the messenger application A11 is selected as a download source, the controller 180 can display a messenger chat window 40 including the first image I1 downloaded thereto on the touchscreen 151 by executing the messenger application. The messenger chat window may include an image I4 that has not been downloaded in addition to the downloaded first image I1. The image I4 can be downloaded by being selected.

When the user participates in a specific schedule registered to the schedule application to acquire the first image I1, the schedule application A12 can be provided along with the image to enable the user to be aware of the schedule on which the first image I1 has been captured. Accordingly, it is possible to enable the user to recognize the situation in which the corresponding image has been downloaded by using the gallery application in the real mode.

Figure 21:
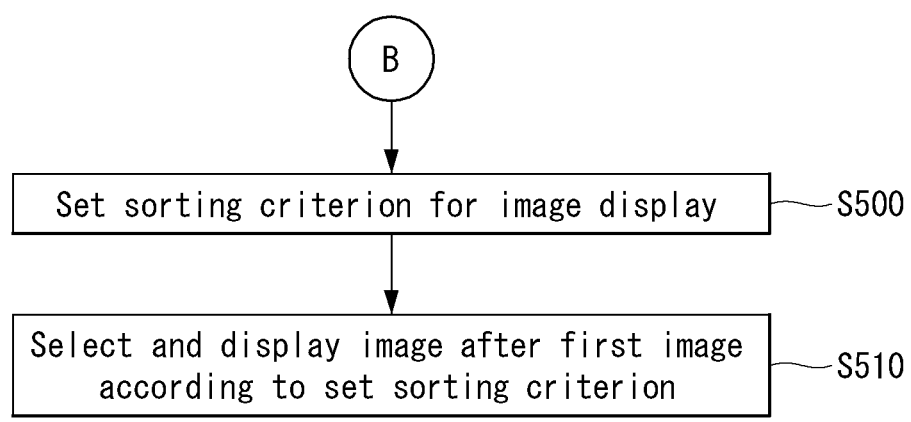
FIG. 21 is a flowchart illustrating a method for controlling the mobile terminal according to another embodiment of the present invention.
Figure 22:
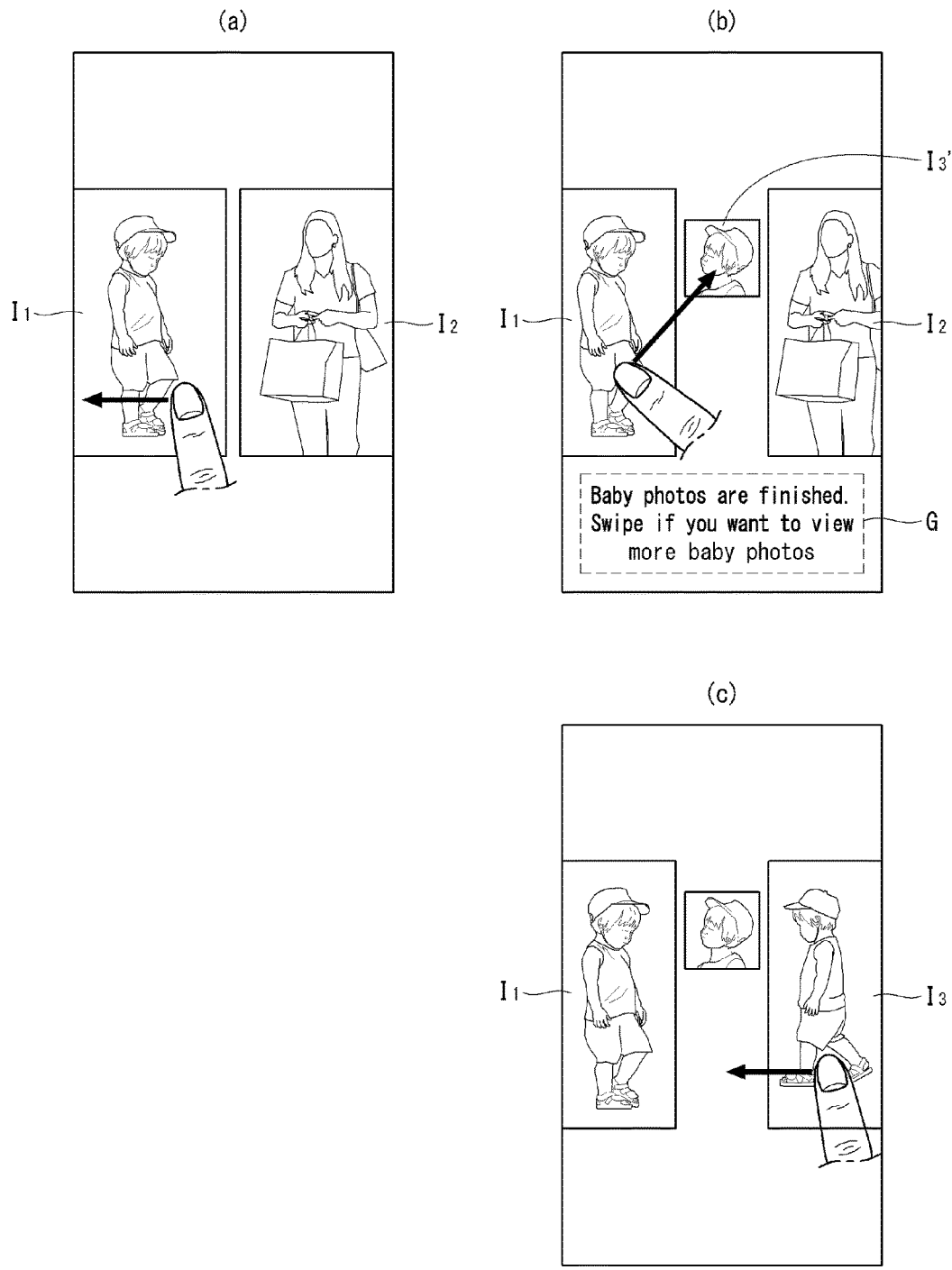
FIGS. 22 and 23 are views for explaining the embodiment illustrated in FIG. 21.
Figure 23:
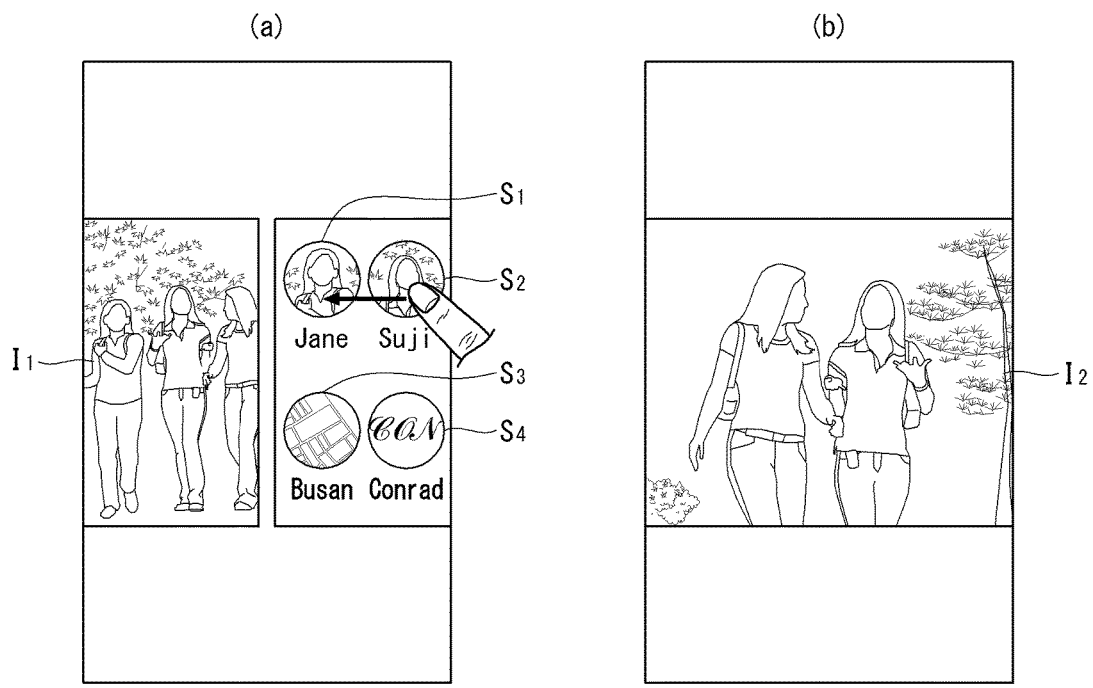

FIG. 21 is a flowchart illustrating a method for controlling the mobile terminal according to another embodiment of the present invention. FIGS. 22 and 23 are views for explaining the embodiment illustrated in FIG. 21. The embodiment illustrated in FIG. 21 may be implemented on the basis of the embodiments illustrated in FIGS. 3, 14, 17 and/or 19 or by being combined therewith.

When the gallery application enters the real mode while multiple images are sequentially displayed through sliding input based on a predetermined criterion, the controller 180 can change the predetermined criterion for displaying the images and provide the images according to the changed criterion.

Referring to FIG. 21, the controller 180 may set a sorting criterion for displaying images in the real mode (S500).

The controller 180 may select an image to be displayed after the first image and display the image according to the sorting criterion (S510).

Referring to FIG. 22, when a plurality of images of the same person (first person), captured at the same place, slides into view, whether the sliding input satisfies a predetermined condition is checked. The predetermined condition may include a case in which no more images including the first person are present.

When the first image I1 is the last image including the first person during sliding input, the controller 180 can provide a blank space on the touchscreen by increasing a gap between the first image I1 and the second image I2 while entering the real mode. When drag input for the sliding input is moved to the blank space (b), the controller 180 can change the image sorting criterion such that images including the first person can be displayed after the first image I1. Here, a thumbnail image I3' of the first image I1 can be displayed in the blank space upon movement of the drag input to notify the user that images to be displayed after the first image I1 are associated with the first person.

The controller 180 may display, on the touchscreen 151, information G for guiding touch interaction of the user for changing the sorting criterion such that images associated with the first person are continuously displayed along with the images.

The controller 180 may sense additional sliding input after the interaction for changing the image soring criterion. The controller 180 may display another image I3 including the first person after the first image I1. The controller 180 can retrieve additional images including the first person from the memory and provide the same according to the image sorting criterion.

Referring to FIG. 23, the controller 180 can provide a candidate group by which an image sorting criterion can be selected in the real mode. For example, the controller 180 can display at least one image sorting criterion between the first image I1 and the second image I2 on the basis of at least one piece of information that can be extracted through the first image I1.

For example, the at least one piece of information that can be extracted through the first image I1 can include persons S1 and S2 included in the first image I1 and information S3 and S4 on positions at which the first image I1 is acquired. Upon selection of a specific person "Suji" S2, the controller 180 can control the image I2 including the selected person to slide into view after the first image I1. The controller 180 can retrieve the image including the selected person from the memory and provide the same.

FIGS. 24 to 28 are views for explaining other embodiments of the present invention.

Figure 24:
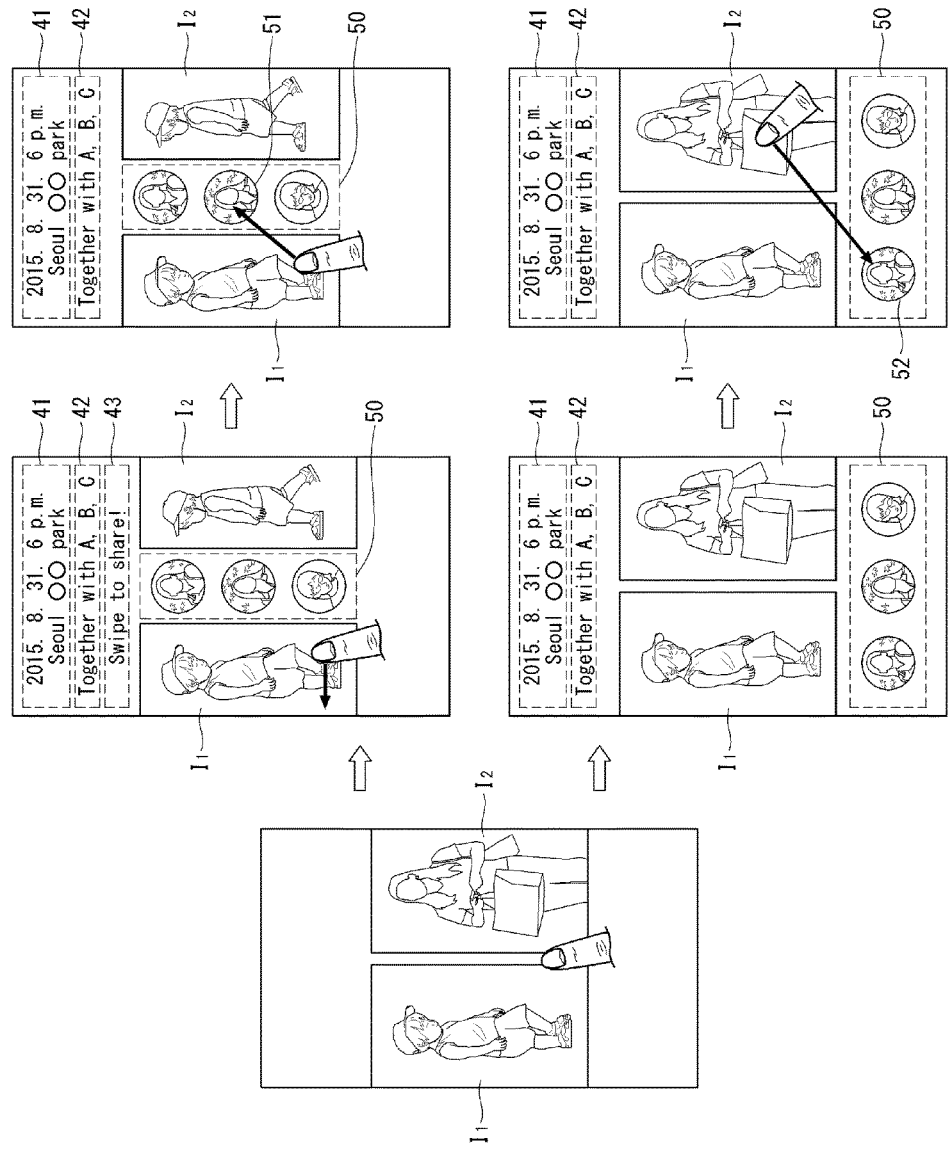
FIGS. 24 to 28 are views for explaining other embodiments of the present invention.

Referring to FIG. 24, the controller 180 can enter the real mode upon reception of long touch input applied to the boundary between the first image I1 and the second image I2 during sliding of the first image I1.

The controller 180 can display information associated with the first image I1 and/or the second image I2 above, below and between the images in the real mode. The associated information may include information 41 on the time and place at which the first and second images I1 and I2 have been captured and information 50 about surrounding people who are not included in the images but surround people included in the images. In addition, the controller 180 can provide guide information 43 for using the associated information.

The controller 180 can execute a function of sharing the first image I1 with a specific person 51 included in the surrounding people information 50 upon reception of input of dragging touch input applied to the first image I1 to the specific person while the associated information is displayed. The surrounding people information 50 can be displayed between the first image I1 and the second image I2 or displayed under the images. Accordingly, the controller 180 can slide images through drag input in the horizontal direction and share images through drag input in the vertical direction.

Figure 25:
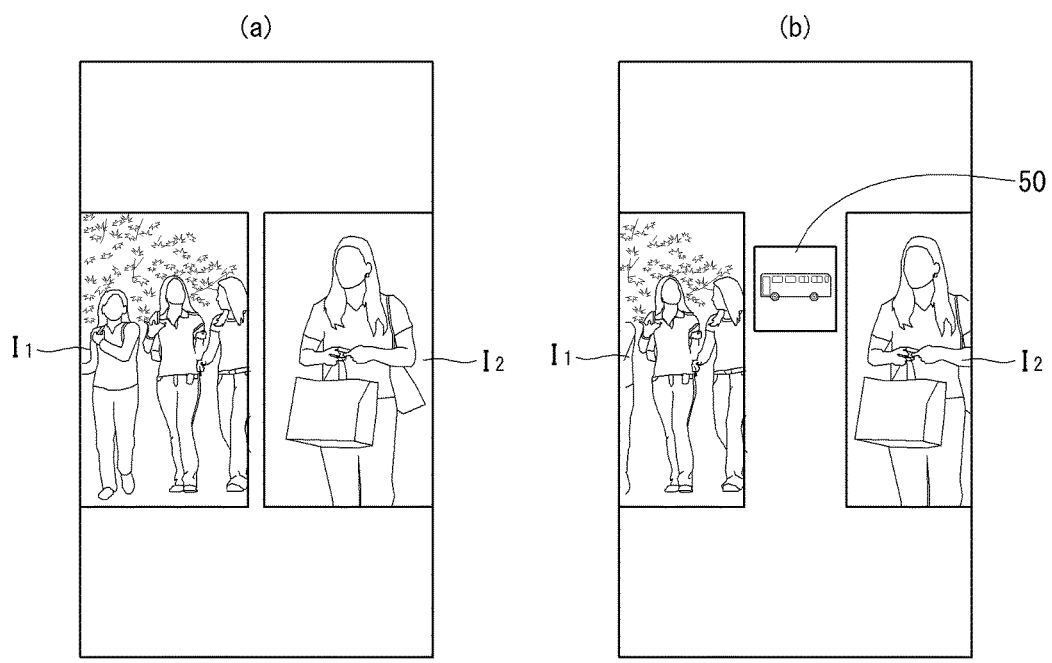

Referring to FIG. 25, when the first image I1 and the second image I2 are captured in different places, the controller 180 can display information 50 about a transportation means used for movement from a first place where the first image I1 has been captured to a second place where the second image I2 has been captured between the first image I1 and the second image I2 in the real mode. In this case, a device-to-device communication link is formed between the transportation means and the mobile terminal 100 such that the information about the transportation means can be added and stored as metadata when the images are captured.

The controller 180 may display the information about the first place around the first image I1 and display the information about the second place around the second image I2 in the real mode.

Figure 26:
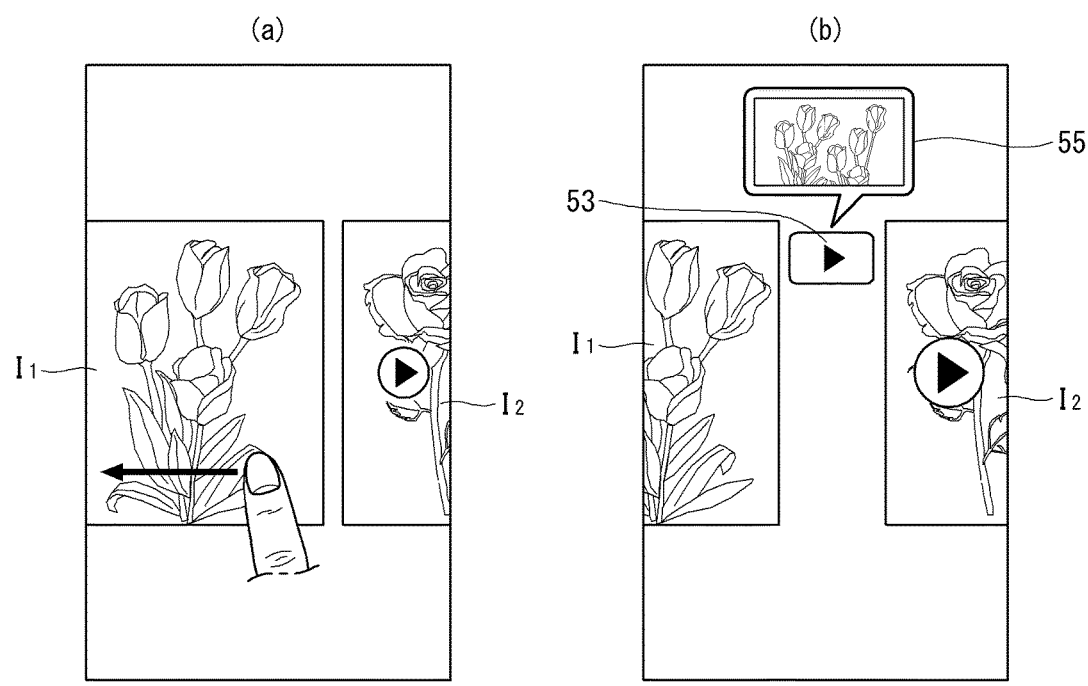

Referring to FIG. 26, the first image I1 may be a still image and the second image I2 displayed after the first image I1 may be a video. The controller 180 can display an icon 53, which indicates that the second image I2 is a video, between the first image I1 and the second image I2 when sliding input satisfies a predetermined condition and thus the mobile terminal enters the real mode. In addition, the controller 180 can extract a still cut 55 of the video and display the still cut 55.

Figure 27:
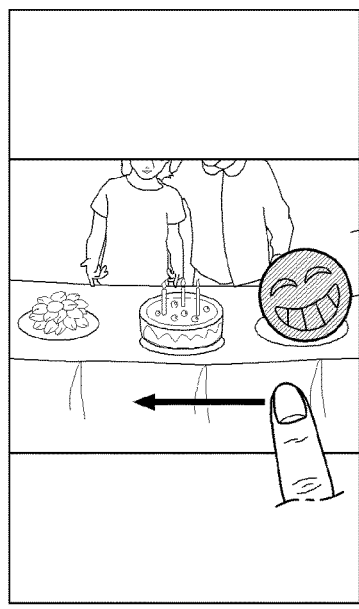
Figure 27:
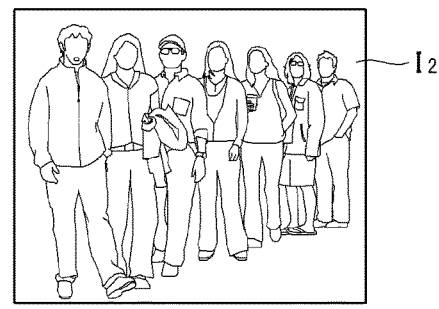
Figure 27:
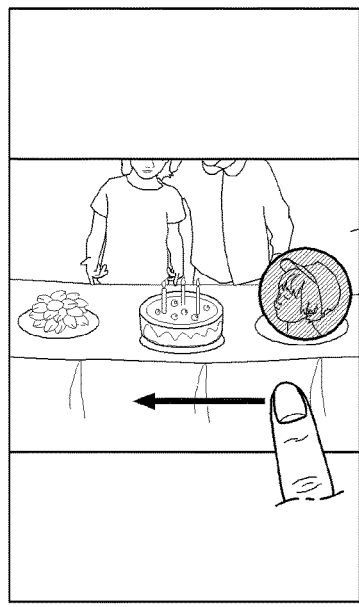
Figure 27:
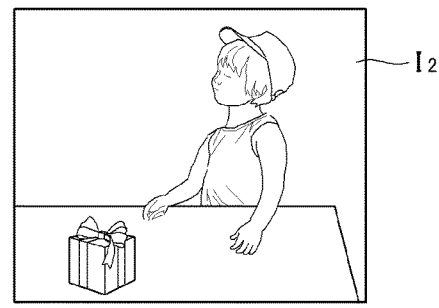

Referring to FIG. 27, the controller 180 enters the real mode during display of the first image I1 from among a plurality of images according to the gallery application. When the second image I2 displayed after the first image I1 is an image in which the user is interested, the controller 180 can display an icon 61 for indicating that the second image I2 is to be displayed. When the second image I2 includes a plurality of persons and thus it is difficult to select a specific person therefrom, it is possible to notify the user that the image in which the user is interested will be displayed through the image icon 61 (FIG. 27(a)).

When the second image I2 provided after the first image I1 is determined to be an image in which the user is interested and a center object capable of representing the image is present, the center object can be displayed as an icon 62 between the first image I1 and the second image I2.

Figure 28:
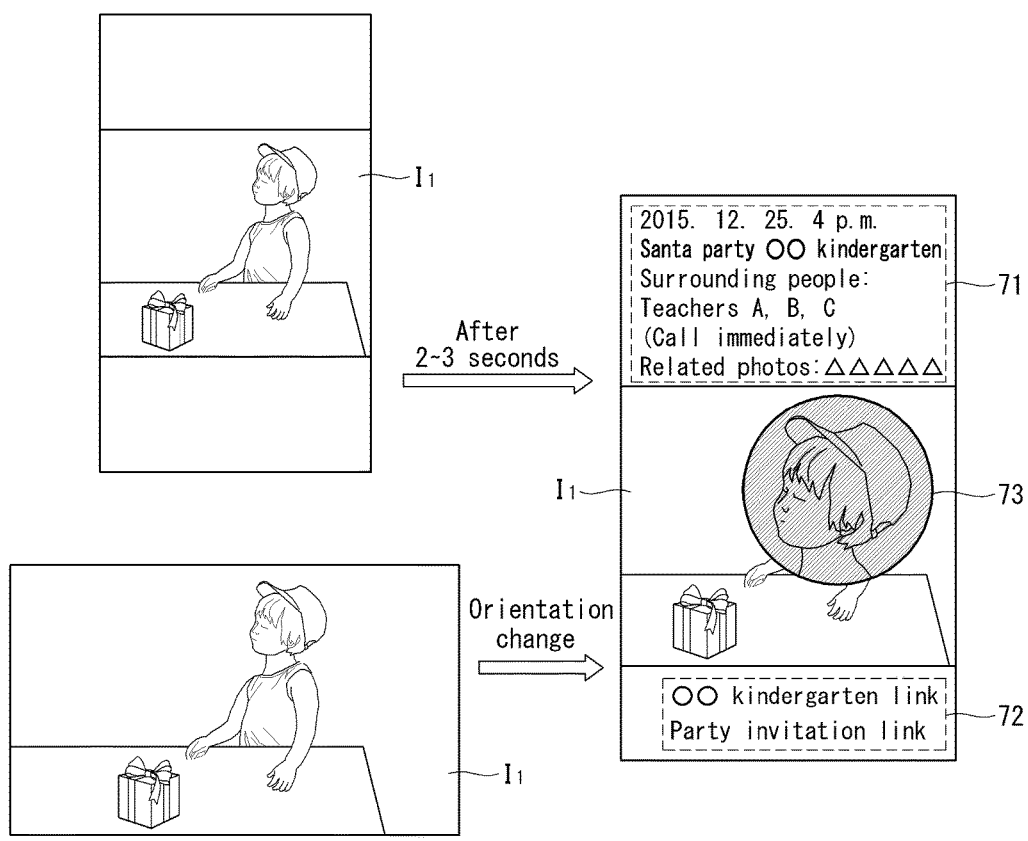

Referring to FIG. 28, the controller 180 can display additional information of the first image I1 along with the first image I1 when a predetermined condition is satisfied without sliding input during display of the first image I1.

The additional information may include information 71 that can be extracted from the mobile terminal 100 and information 72 associated with the first image I1 and received from an external device. The information 71 may be displayed in the upper part of the touchscreen and the information 72 may be displayed in the lower part of the touchscreen. The additional information may include an object obtained by zooming in on a specific object included in the first image I1.

For example, the controller 180 can control the gallery application to be executed in the real mode so as to display the additional information on the touchscreen 151 when a predetermined time elapses after display of the first image I1. Here, animation effects can be applied to the additional information 71, 72 and 73 such that the additional information is gradually displayed around the first image I1 displayed on the touchscreen 151 in the real mode.

Upon sensing change of the orientation of the mobile terminal 100 to the portrait mode when the first image I1 is displayed in first resolution on the touchscreen 151 in the landscape mode, the controller 180 controls the gallery application to be executed in the real mode. The controller 180 controls the resolution of the first image I1 such that the first image I1 corresponds to the portrait mode and displays the first image I1 in the middle of the touchscreen 151. Blank areas are generated in the upper part and the lower part of the touchscreen 151 according to resolution control, and the additional information 71 and 72 can be displayed in the blank areas.

Examples of providing additional information associated with prestored images along with the images when the gallery application is executed in the real mode have been described. The controller 180 can store images provided in the real mode as a separate file.

Figure 29:
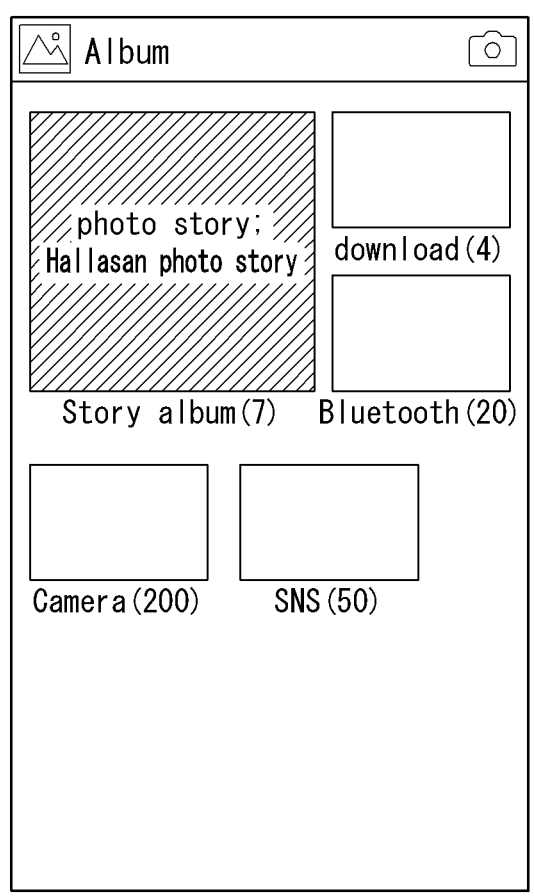
FIGS. 29 and 30 are views for explaining other embodiments of the present invention.
Figure 30:
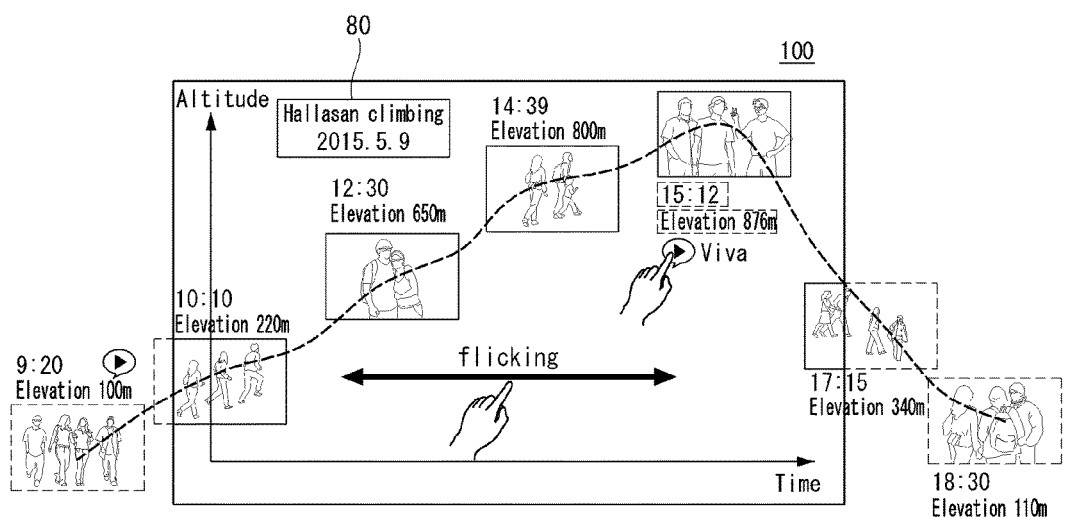

FIGS. 29 and 30 are views for explaining other embodiments of the present invention.

The controller 180 can enter the real mode while providing an image in the normal mode by executing the gallery application and store additional information, which is provided together with a plurality of images sliding into view in the real mode, as a file separated from the plurality of images, thereby generating an album file including a story about the image.

Referring to FIG. 29, the gallery application can provide an album view menu for classifying images stored in the mobile terminal into groups and providing the image groups. An album storing images downloaded from external devices, an album storing images received from external devices through short-range communication (Bluetooth), an album storing images captured through the camera of the mobile terminal and an album storing images downloaded through the messenger application can be provided through the album view menu. Images and additional information provided during operation of the gallery application in the real mode according to an embodiment of the present invention can be provided in the form of a story album through the gallery application. The story album (e.g. "Hallasan photo story") can be selected.

Referring to FIG. 30, the story album is obtained by viewing a plurality of images captured during Hallasan tracking in the real mode and then storing the same. When the story album is executed, the controller 180 can set the horizontal axis of the touchscreen 151 as a virtual time axis, set the vertical axis of the touchscreen 151 as a virtual altitude axis, and then arrange and display images classified according to image capture time and altitude on the touchscreen 151 such that the images correspond to the virtual time axis and altitude axis provided to the touchscreen 151. Accordingly, it is possible to indirectly realize presence of actual tracking through the mobile terminal 100 by providing images captured during tracking in the real mode in the mobile terminal 100.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Accordingly, an object of the present invention is to address the above-noted and other problems.

An object of the present invention is to provide a mobile terminal for providing a user interface through which a user can easily and efficiently control the mobile terminal and a method for controlling the same.

Another object of the present invention is to provide a mobile terminal for providing additional information of a generated image along with the image during execution of an application so as to display the image with presence, in display of images using a gallery application, and a method for controlling the same.

Yet another object of the present invention is to provide a mobile terminal capable of using an image in various manners in one application using displayed additional information without closing the gallery application, in display of images using the gallery application, and a method for controlling the same.

Technical tasks obtainable from the present invention are not limited to the above-mentioned technical task. In addition, other unmentioned technical tasks can be clearly understood from the following description by those having ordinary skill in the technical field to which the present invention pertains.

According to an aspect of the present invention, a mobile terminal includes: a touchscreen; and a controller configured to execute an application for displaying images to display a plurality of images on the touchscreen in a sliding manner, wherein the controller is configured to display information associated with a first image and a second image on the touchscreen when sliding from the first image to the second image satisfies a predetermined condition.

The predetermined condition may include a case in which the speed of drag input for sliding the first image is lower than a predetermined level or a case in which sliding input for the first image is received after display of the first image for a predetermined time or longer.

The predetermined condition may include a case in which the first image is displayed on the touchscreen for a predetermined time or longer without sliding to the second image.

The associated information may include attribute information commonly included in the first and second images, wherein the attribute information includes information about time and place at which the first and second images were captured, persons and objects included in the first and second images.

The associated information may include information stored along with the first or second image locally in the mobile terminal or information received from external devices through a communication unit.

The associated information may include thumbnails corresponding to a specific person included in the first or second image and thumbnails including a specific person who is not included in the first or second image but was around the person included in the first or second image when the first or second image was captured.

The controller may be configured to control the first image to be shared with a user corresponding to a thumbnail when touch input applied to the first image is moved to the thumbnail during sliding of the first image through the touch input.

The associated information may include at least one of a representative thumbnail of the second image, a thumbnail indicating information to slide into view after the second image and a representative thumbnail of video when the second image is the video.

The associated information may include a download source of the plurality of images, wherein the controller is configured to execute an application corresponding to the download source when the download source is selected.

The first image may be the last image of a plurality of images having a common attribute when the images slide into view, wherein the controller is configured to control a blank space to be displayed between the first image and the second image when the first image is displayed and to determine a type of the second image to be displayed after the first image through touch interaction applied to the blank space.

The controller may be configured to display guide information for guiding the touch interaction applied to the blank space on the touchscreen.

The associated information may include an image having characteristics of the first and second images, wherein the controller is configured to set the image as a background image of the images sliding into view and to display the background image.

The controller may be configured to display the associated information between the first image and the second image.

The controller may be configured to display the associated information in an area other than an area in which at least part of the first or second image is displayed, from among the overall area of the touchscreen.

The controller may be configured to temporarily stop image sliding and to display the associated information on the touchscreen when the predetermined condition is satisfied.

The controller may be configured to execute the application to control the plurality of images to slide into view in a first mode or a second mode, wherein the controller is configured to control the images to sequentially slide into view through the touchscreen in the first mode and, when the predetermined condition is satisfied, to display the associated information on the touchscreen in the second mode.

At least one image displayed in the second mode may be stored as an album file.

According to another aspect of the present invention, a method for controlling a mobile terminal includes: executing an application for displaying images; receiving input of sliding from a first image to a second image during display of a plurality of images on a touchscreen in a sliding manner; and displaying information associated with the first and second images on the touchscreen when the sliding input satisfies a predetermined condition.

The method may further include: displaying a blank space between the first image and the second image when the predetermined condition is satisfied; and displaying the associated information in the blank space.

The associated information may include first information stored along with the images or second information received from an external device through a communication unit, wherein the first information is displayed above the images and the second information is displayed below the images.

The mobile terminal and the method for controlling the same according to the present invention have the following advantages.

According to the present invention, it is possible to provide a user interface through which a user can easily and efficiently control the mobile terminal.

According to the present invention, it is possible to provide additional information of a generated image along with the image during execution of an application so as to display the image with presence, in display of images using a gallery application.

According to the present invention, it is possible to use an image in various manners in one application using displayed additional information without closing the gallery application, in display of images using the gallery application.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a touchscreen; and
   a controller configured to execute an application for displaying images on the touchscreen, the controller to display a plurality of images on the touchscreen in a sequential sliding manner,
   wherein in response to a sliding input, the controller is configured to slide a display of a first image and to display at least a portion of a second image on the touchscreen, and
   when a predetermined condition is determined to be satisfied, the controller is configured to display information associated with the first image and the second image,
   wherein the controller is configured to set an image representing the first image and the second image as a background image and to display the background image on an entire area of the touchscreen, and wherein the first image and the second image are displayed to overlap at least part of the background image.

2. The mobile terminal according to claim 1, wherein the predetermined condition includes:
   a speed of a drag input for sliding the first image is less than a predetermined level, or
   a sliding touch input at the first image is received after displaying the first image for at least a predetermined time.

3. The mobile terminal according to claim 1, wherein the predetermined condition includes:
   the first image is displayed on the touchscreen for at least a predetermined time without sliding of the second image.

4. The mobile terminal according to claim 1, wherein the displayed information includes attribute information included with the first and second images, wherein the attribute information includes information regarding at least one of:
   time and place at which the first and second images were captured,
   at least one person included in the first and second images, and
   at least one object included in the first and second images.

5. The mobile terminal according to claim 1, wherein the displayed information includes information stored, in the mobile terminal, with the first or second image or information received from at least one external device through a communication unit.

6. The mobile terminal according to claim 1, wherein the displayed information includes:
   at least one thumbnail corresponding to a specific person included in the first or second image, and at least one thumbnail including a specific person that is not included in the first or second image but was around the person included in the first or second image when the first or second image was captured.

7. The mobile terminal according to claim 6, wherein in response to a touch input at the first image and a touch input at a thumbnail, the controller is configured to control the first image to be shared with a user corresponding to the thumbnail.

8. The mobile terminal according to claim 1, wherein the displayed information includes at least one of:
   a representative thumbnail of the second image,
   a thumbnail indicating information to slide into view after the second image, and
   a representative thumbnail of a video when the second image is the video.

9. The mobile terminal according to claim 1, wherein the displayed information includes a download source of the plurality of images,
   wherein in response to a selection of the download source, the controller is configured to execute an application corresponding to the download source.

10. The mobile terminal according to claim 1, wherein the first image is a last image of a plurality of images having a common attribute when the images slide into view,
    wherein the controller is configured to control the touchscreen to display a blank area between the first image and the second image when the first image is displayed and to determine a type of the second image to be displayed after the first image through touch interaction at the blank area.

11. The mobile terminal according to claim 10, wherein the controller is configured to display, on the touchscreen, guide information for guiding the touch interaction at the blank space.

12. The mobile terminal according to claim 1, wherein the displayed information includes an image having characteristics of the first and second images.

13. The mobile terminal according to claim 1, wherein the controller is configured to display, on the touchscreen, the displayed information between the first image and the second image.

14. The mobile terminal according to claim 1, wherein the controller is configured to display, on the touchscreen, the displayed information in an area of the touchscreen other than an area in which at least part of the first or second image is displayed.

15. The mobile terminal according to claim 1, wherein the controller is configured to temporarily stop image sliding and to display, on the touchscreen, the information when the predetermined condition is satisfied.

16. The mobile terminal according to claim 1, wherein the controller is configured to execute the application to control the plurality of images to slide into view in a first mode or a second mode,
    wherein the controller is configured to control the images to sequentially slide into view through the touchscreen in the first mode and, when the predetermined condition is satisfied, to display, on the touchscreen, the information in the second mode.

17. The mobile terminal according to claim 16, wherein at least one image displayed in the second mode is stored as an album file.

18. A method for controlling a mobile terminal, comprising:
    executing an application for displaying a plurality of images;
    receiving a sliding input for sliding the plurality of images on a touchscreen in a sequential sliding manner;
    receiving a sliding input on the touchscreen to slide a first image and to display at least a portion of a second image on the touchscreen;
    determining that a predetermined condition is satisfied;
    displaying, on the touchscreen, information associated with the first and second images when the predetermined condition is determined to be satisfied; and
    setting an image representing the first image and the second image as a background image and to display the background image on an entire area of the touchscreen, and wherein the first image and the second image are displayed to overlap at least part of the background image.

19. The method according to claim 18, further comprising:
    displaying, on the touchscreen, a blank area between the first image and the second image when the predetermined condition is determined to be satisfied; and
    displaying the information in the blank area.

20. The method according to claim 18, wherein the displayed information includes first information stored with the images or second information received from an external device through a communication unit,
    wherein the first information is displayed on the touchscreen above the images, and the second information is displayed on the touchscreen below the images.

* * * * *